United States Patent
Zhang

(10) Patent No.: US 12,100,193 B2
(45) Date of Patent: Sep. 24, 2024

(54) WATERMARK AS HONEYPOT FOR ADVERSARIAL DEFENSE

(71) Applicant: PayPal, Inc., San Jose, CA (US)

(72) Inventor: Jiyi Zhang, Singapore (SG)

(73) Assignee: PayPal, Inc., San Jose, CA (US)

(*) Notice: Subject to any disclaimer, the term of this patent is extended or adjusted under 35 U.S.C. 154(b) by 0 days.

(21) Appl. No.: 17/984,824

(22) Filed: Nov. 10, 2022

(65) Prior Publication Data
US 2023/0095320 A1 Mar. 30, 2023

Related U.S. Application Data

(63) Continuation of application No. 16/887,381, filed on May 29, 2020, now Pat. No. 11,501,136.

(51) Int. Cl.
| | |
|---|---|
| G06V 10/44 | (2022.01) |
| G06F 18/214 | (2023.01) |
| G06N 3/045 | (2023.01) |
| G06N 3/08 | (2023.01) |
| G06T 1/00 | (2006.01) |
| G06V 10/764 | (2022.01) |
| G06V 10/82 | (2022.01) |

(52) U.S. Cl.
CPC .......... *G06V 10/454* (2022.01); *G06F 18/214* (2023.01); *G06N 3/045* (2023.01); *G06N 3/08* (2013.01); *G06T 1/005* (2013.01); *G06V 10/764* (2022.01); *G06V 10/82* (2022.01); *G06T 2201/0063* (2013.01)

(58) Field of Classification Search
CPC ...... G06N 3/0454; G06N 3/08; G06K 9/6256; G06T 1/005; G06T 2201/0063
See application file for complete search history.

(56) References Cited

U.S. PATENT DOCUMENTS 10,902,543 B2 * 1/2021 Kakkirala .............. G06N 20/00
11,521,043 B2 * 12/2022 Uchida ................ G06T 1/0021
(Continued)

FOREIGN PATENT DOCUMENTS

KR 102 099 019 B1 4/2020

OTHER PUBLICATIONS

Guo J., et al., "Watermarking Deep Neural Networks for Embedded Systems," 2018 IEEE/ACM International Conference on Computer-Aided Design (ICCAD), Nov. 8, 2018, Retrieved from Internet URL: https://ieeexplore.ieee.org/abstract/document/8587745, Retrieved on Jul. 20, 2021, 8 pages.
(Continued)

*Primary Examiner* — Shefali D Goradia
(74) *Attorney, Agent, or Firm* — Haynes and Boone, LLP

(57) ABSTRACT

Systems, methods, and computer program products for determining an attack on a neural network. A data sample is received at a first classifier neural network and at a watermark classifier neural network, wherein the first classifier neural network is trained using a first dataset and a watermark dataset. The first classifier neural network determines a classification label for the data sample. A watermark classifier neural network determines a watermark classification label for the data sample. A data sample is determined as an adversarial data sample based on the classification label for the data sample and the watermark classification label for the data sample.

20 Claims, 18 Drawing Sheets

(56) References Cited

U.S. PATENT DOCUMENTS

| | | | |
|---|---|---|---|
| 2003/0095683 | A1 | 5/2003 | Najarian |
| 2014/0142958 | A1 | 5/2014 | Sharma et al. |
| 2015/0039543 | A1 | 2/2015 | Athmanathan et al. |
| 2015/0102216 | A1 | 4/2015 | Roder et al. |
| 2015/0254555 | A1 | 9/2015 | Williams, Jr. et al. |
| 2016/0036837 | A1 | 2/2016 | Jain et al. |
| 2019/0294955 | A1* | 9/2019 | Uchida ............ G06N 20/20 |
| 2019/0370440 | A1 | 12/2019 | Gu et al. |
| 2020/0012851 | A1 | 1/2020 | Stanley et al. |
| 2020/0019857 | A1 | 1/2020 | Wang et al. |
| 2020/0134461 | A1 | 4/2020 | Chai et al. |
| 2020/0250304 | A1 | 8/2020 | Kruus et al. |
| 2020/0395117 | A1* | 12/2020 | Schnorr ............ G06N 3/088 |
| 2021/0150312 | A1 | 5/2021 | Lwowski et al. |
| 2021/0256978 | A1 | 8/2021 | Jin et al. |

OTHER PUBLICATIONS

International Search Report and Written Opinion for Application No. PCT/US2021/033106 mailed on Sep. 9, 2021, 9 pages.

Ma X., et al., "Characterizing Adversarial Subspaces Using Local Intrinsic Dimensionality," Mar. 14, 2018, 15 pages.

Meng D., "MagNet: a Two-Pronged Defense against Adversarial Examples," Sep. 11, 2017, 13 pages.

Xu W., "Feature Squeezing: Detecting Adversarial Examples in Deep Neural Networks," Dec. 5, 2017, 15 pages.

Yang Z., et al., "Effectiveness of Distillation Attack and Countermeasure on Neural Network Watermarking," Cornell University, Jun. 14, 2019, 15 pages.

Extended European Search Report dated Aug. 11, 2023 from European application No. EP 21812177.0, 11 pages.

Shan et al., "Using Honeypots to Catch Adversarial Attacks on Neural Networks," Mar. 25, 2020, 17 pages.

Feinman et al., "Detecting Adversarial Samples from Artifacts," Mar. 13, 2017, 9 pages.

Zhang et al., "Detection and Recovery of Adversarial Attacks with Injected Attractors," Mar. 5, 2020, 15 pages.

Samangouei et al., "Defense-GAN: Protecting Classifiers Against Adversarial Attacks Using Generative Models," May 18, 2018, 17 pages.

International Preliminary Report on Patentability for Application No. PCT/US2021/033106 mailed on Dec. 8, 2022, 8 pages.

\* cited by examiner

WATERMARK AS HONEYPOT FOR ADVERSARIAL DEFENSE

CROSS-REFERENCE TO RELATED APPLICATIONS

This application is a continuation of U.S. patent application Ser. No. 16/887,381 filed May 29, 2020, the benefit of which is claimed and the disclosure of which is incorporated herein in its entirety.

TECHNICAL FIELD

The disclosure generally relates to neural networks and more specifically to preventing adversarial attacks on neural networks.

BACKGROUND

With the progress in modern learning theories and advancement of general-purpose computing on graphics processing units (GPGPU), machine learning models are becoming more powerful. Machine learning models, especially deep neural networks, achieve excellent performance in tasks such as image classification, object detection and natural language processing. Nonetheless, most machine learning models are vulnerable towards attacks using adversarial samples. Adversarial samples are data samples that are received by the machine learning model and that have a small perturbation, such as a change of a pixel value, from clean data samples. However, the small perturbation in the adversarial samples causes the machine learning model to generate a wrong result.

Figure 1:
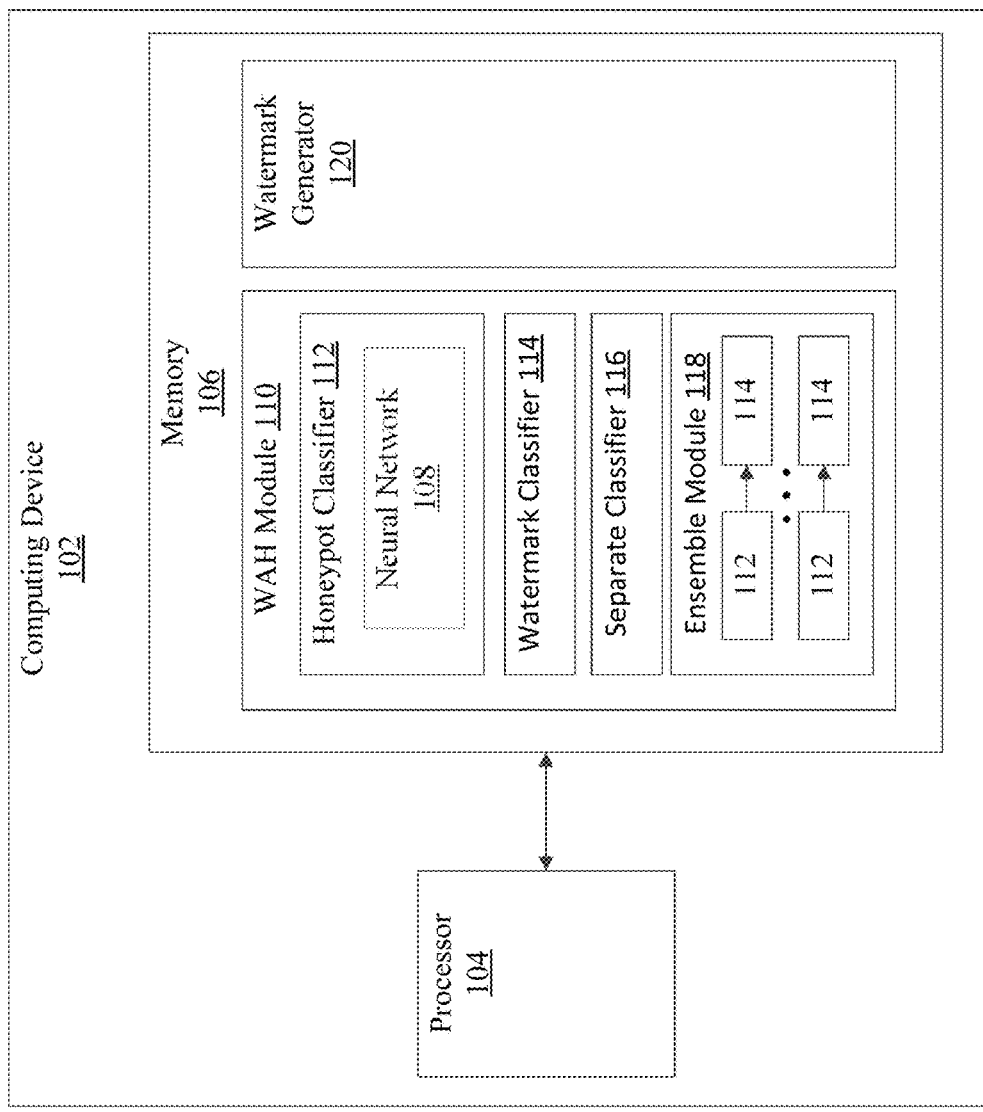
FIG. 1 is a computing system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The embodiments disclose a neural network, e.g. a honeypot classifier, that is trained to identify adversarial data during an adversarial attack. The neural network is trained using clean data or samples in a dataset and watermarks in a watermark dataset. While the attacker may obtain the data in a clean dataset, the watermarks in the watermark dataset are unknown. Accordingly, when the clean data is modified in an adversarial attack into adversarial samples and is passed through the neural network, the classification label determined by the neural network is tainted or infected with the watermarks.

The embodiments disclose a watermark neural network, e.g. a watermark classifier that identifies a watermark classification label or simply watermark label from a clean or adversarial sample. The watermark label and the classification label may be used to determine whether the sample received by the honeypot classifier is a clean sample or an adversarial sample.

The embodiments disclose a watermark generator neural network for generating watermarks for a watermark data set from latent vectors. The latent vectors may be derived from an unlimited number of non-overlapping gaussian distributions and assigning watermark labels to the watermarks. Because there is an unlimited number of non-overlapping gaussian distributions there can be an unlimited number of possible watermarks.

The embodiments disclose neural network structures for the honeypot classifier neural network, the watermark neural network, and the watermark generator neural network.

FIG. 1 is a computing system 100 where embodiments can be implemented. System 100 includes a computing device 102 that may be a portable or non-portable electronic device under the control of a user or a server that acts as a back-end for processing data and instructions received from other computing devices. Example computing devices are discussed in further detail in FIGS. 16 and 17.

Computing device 102 includes a processor 104 and a memory 106. Processor 104 and memory 106 are discussed in further detail in FIG. 17. Memory 106 may store a neural network 108 which is executed by processor 104. Neural network 108 may be a combination of one or more layers and include one or more neurons within each layer. Each neuron may be connected with some or all neurons in the adjacent layers and may be assigned one or more weights. The weights manipulate data received at the neuron and generate data that is an output to the neuron. Neural network 108 may be trained using a training dataset to generate an expected output for the training dataset. Once trained, neural network 108 may receive data as input and generate an output for the data. Because the data is the same or similar to the data in the training dataset the neural network generates an output for the data that is the same or similar as the output for the data in the training dataset.

Adversarial attacks make use of this property of neural network 108 to generate fraudulent results. In neural network 108 that is included in a payment processing application, an example fraudulent result may be an authorization to pay for a purchase that is associated with a stolen credit card or to issue an authorization for a refund because a purchased item was deemed returned. One way to generate a fraudulent result is to generate an adversarial sample that perturbs a clean sample. When clean data is an image, the adversarial sample may be created by perturbing a large number of pixels in the image by a small amount or perturbing a small number of pixels in the image by a large amount. Both perturbations may produce adversarial samples that are outside the training distribution.

In some embodiments, a watermark as honeypot (WAH) module 110 is used to detect out-of-distribution input generated using adversarial attacks. WAH module may be stored in memory 106. WAH module 110 may include a honeypot classifier H 112, a watermark classifier Q 114. In some embodiments, WAH module 110 may also include a separate classifier S 116, and an ensemble module 118. Notably, although shown as being included in a single WAH module 110, these components may also be individually included in different WAH modules 110.

WAH module 110 may prevent or minimize an adversarial attack by adding detectable watermarks to the adversarial samples of data while generating a correct classification result for clean or non-adversarial data. In other words, WAH module 110 may mark adversarial samples with a watermark classifier and then use the watermark classifier to identify the adversarial samples.

As discussed above, WAH module 110 includes a honeypot classifier H 112. Honeypot classifier H 112 may be neural network 108 that is trained with a dataset that includes clean data and a watermark dataset. For example, suppose a training set D has N classes with class labels $d_1 \ldots, d_N$ and a watermark dataset W has a different distribution from dataset D which does not overlap with dataset D. The N classes for watermark dataset W may be $w_1 \ldots, w_N$. WAH module 110 may generate a combined dataset C that combines datasets D and W, or $C = D \cup W$. In this case, each class label $c_i$ contains all the samples from $d_i$ and $w_i$. The combined dataset C with class labels c may be shown as:

$$\forall x : \forall i \in \{1, \ldots, N\} : \{x \in d_i \lor x \in w_i \leftrightarrow x \in c_i\}$$

In some embodiments, the ratio of samples from dataset D and samples from watermark dataset W in class C may be such that dataset D is not diluted by watermark dataset W.

Figure 2:
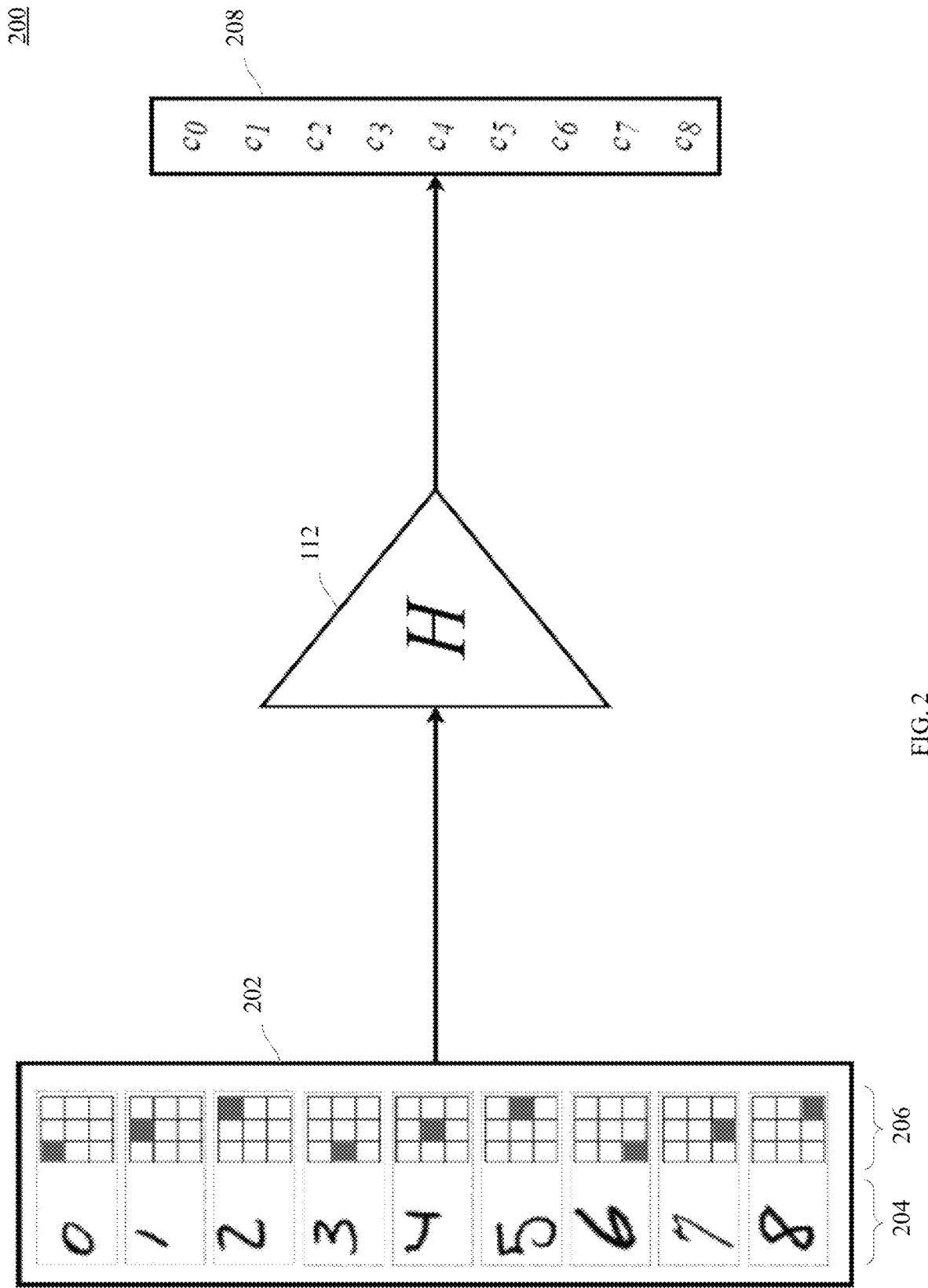
FIG. 2 is a block diagram of a honeypot classifier, according to an embodiment.

FIG. 2 is a block diagram 200 of a honeypot classifier, according to an embodiment. Honeypot classifier H 112 may receive data samples that include clean data, e.g. data in dataset D 204 and adversarial data that has been modified by the attacker. Honeypot classifier H 112 classifies each data sample into class labels c 208. The structure of honeypot classifier H 112 is discussed further in FIG. 7.

In some embodiments, prior to detecting adversarial samples, honeypot classifier H 112 may be trained using data in dataset C 202. Data in dataset C 202 may include clean or non-adversarial data from dataset D 204 and watermarks in watermark dataset W 206. The class labels for dataset C 202 are known. Training honeypot classifier H 112 constitutes passing data in dataset C 202 through honeypot classifier H 112 while modifying the internal weights of honeypot classifier H 112 and generating class labels c 208. The training continues until honeypot classifier H 112 classifies data in dataset C 202 into class labels c 208 with an error as compared to the known class labels that is below a configurable threshold.

Once honeypot classifier H 112 is trained, honeypot classifier H 112 may misclassify adversarial data in an event of an attack. When neural network 108 trained as honeypot classifier H 112 is installed on computing device 102, an attacker may attack neural network 108 using data that is a perturbed version of data in dataset D 204. This is because data in dataset D 204 is typically known and accessible, but the watermarks in watermark dataset W 206 are stored securely and are not available to the attacker.

For example, supposed dataset D 204 includes an image x. The attacker may choose to perturb or modify image x to image x' such that the score that is an output of honeypot classifier H 112 for the correct classifier class for image x is decreased or the score for a target class is increased. The attacker may also choose an optimal direction of perturbation to minimize the difference between image x and image x'. However, when honeypot classifier H 112 receives and classifies image x', the increase or decrease in the score of certain class $c_i$ is unavoidably associated with the corresponding class of the watermark $w_i$. Accordingly, the class of the watermark $w_i$ may indicate that the sample, e.g. image x' is an adversarial sample, which indicates an adversarial attack.

Going back to FIG. 1, as discussed above, WAH module 110 may include watermark classifier Q 114. Watermark classifier Q 114 may detect the watermarks in an adversarial sample and use the watermarks to trace the evidence of the attacks. FIG. 3 is a block diagram 300 of a watermark classifier, according to an embodiment. Watermark classifier Q 114 may receive data in datasets D 204, watermark dataset D 206 or combined dataset C 202 and classify the data into watermark labels w 304. The structure of watermark classifier Q 114 is discussed further in FIG. 9. Generally, watermark classifier Q 114 has the same or similar structure as honeypot classifier H 112.

Figure 3A:
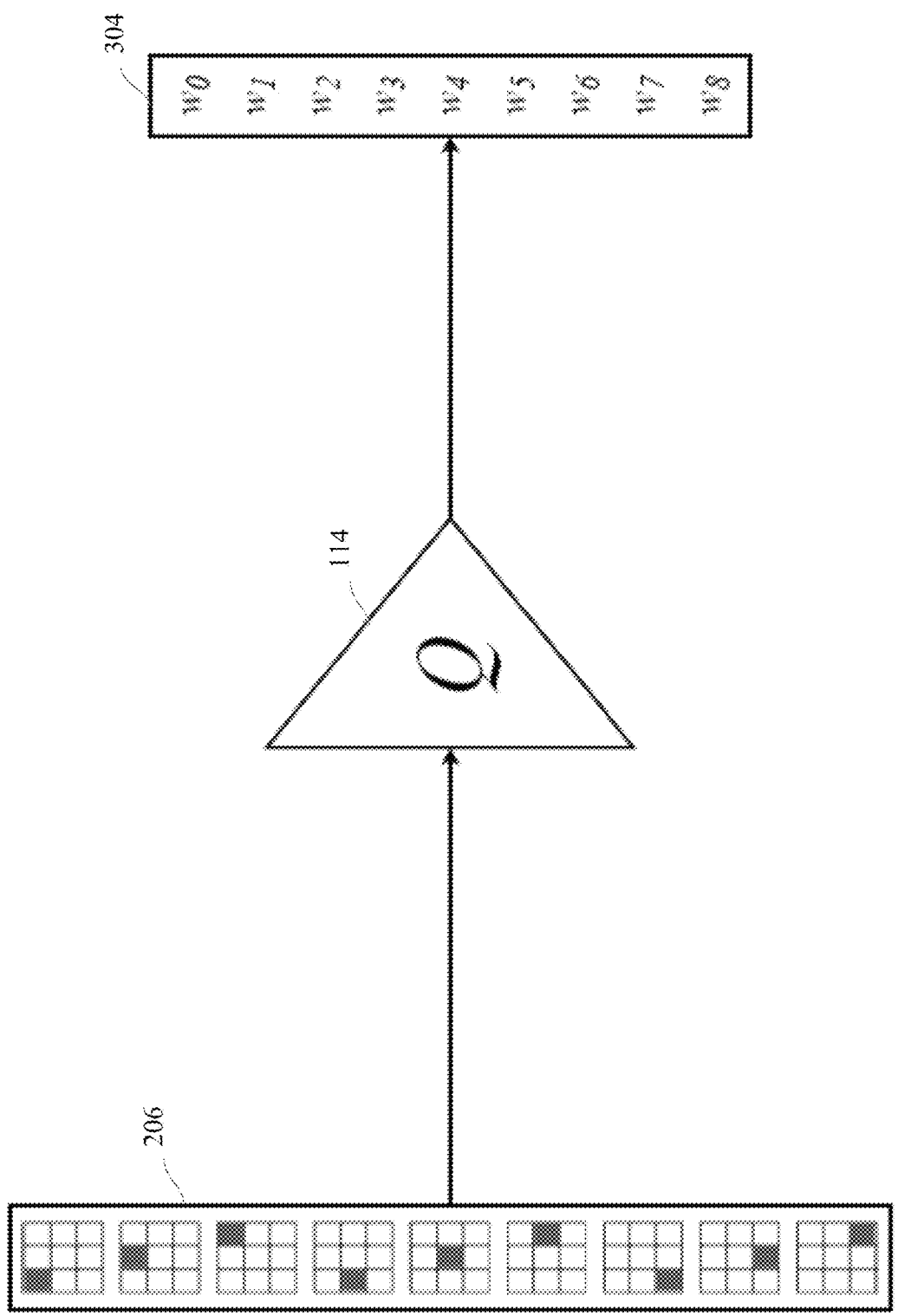
FIG. 3A is a block diagram of a watermark classifier, according to an embodiment.

As illustrated in FIG. 3A, watermark classifier Q 114 may be trained using a synthesized watermark dataset W 206 that includes watermarks as data samples. Watermark dataset W 206 may be randomly cropped, resized, and rotated to make the watermark classifier Q 114 more robust against input transformation. During training, watermark classifier Q 114 may act as a multi-class classifier with watermark labels w 304 as the ground truth.

Once trained, watermark classifier Q 114 may receive data, which may be data samples in datasets D 204, W 206, or C 202 as input and identify one of watermark labels w 304 that is associated with the input. When watermark classifier Q 114 receives perturbed adversarial samples, e.g. images x' generated by the attacker, the adversarial samples make a significant change to the soft label (one of watermark labels w 304) of watermark classifier Q 114 as compared to the class label c 208 of the honeypot classifier H 112. The discrepancy in the class labels c 208 and watermark labels w 304 may be used to identify the adversarial data samples.

Figure 3B:
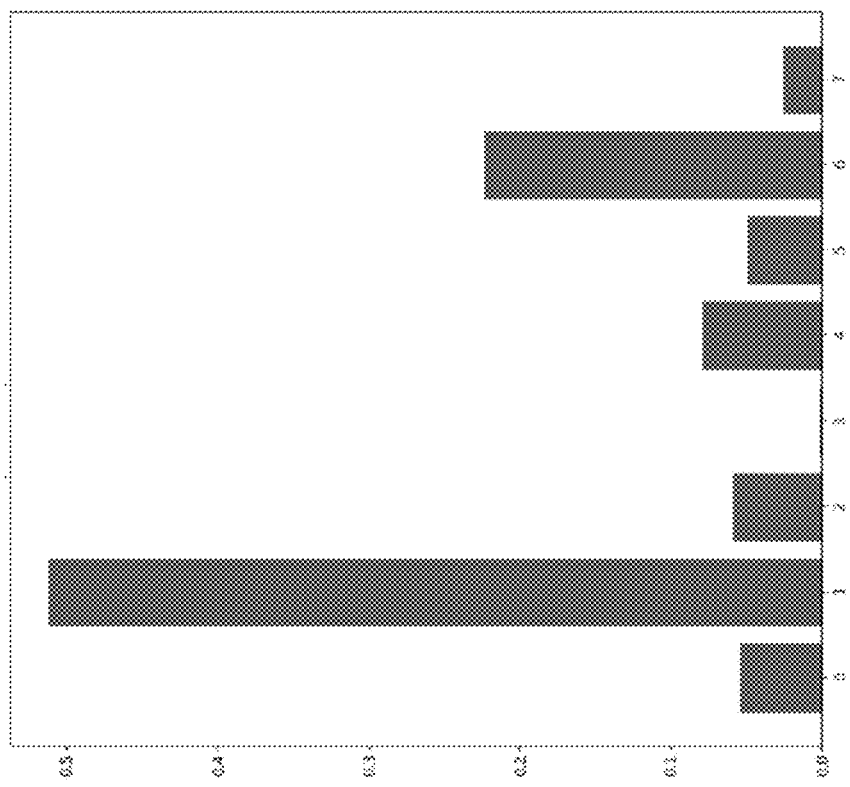
FIG. 3B is a diagram of tables illustrating watermark labels generated from clean data and adversarial data, according to an embodiment.
Figure 3B:
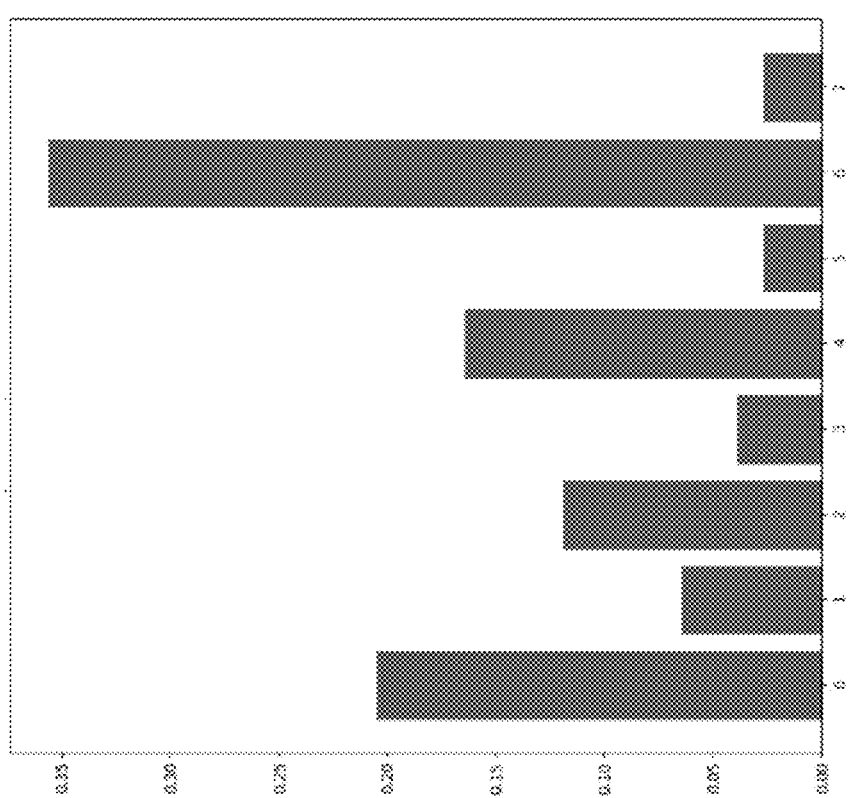

For example, suppose a conventional Fast Gradient Sign Method (FGSM) attack occurs on neural network 108. The FGSM attack may apply to data samples that are images. In the FGSM attack a small perturbation in the one or more pixels in the image causes a large change in the output of neural network. Suppose an input image used in the FGSM attack may be an image x from a (Modified National Institute of Standards and Technology) MNIST dataset which includes images of numbers in various formats. The FGSM attack may perturb image x into image x'. Suppose when the clean input image x passes through honeypot classifier H 112 and is classified with a class label=3 shown as class label $c_3$. However, when the image x is perturbed using the FGSM attack into image x' and image x' passes through the honeypot classifier H 112, the image x' is classifier with a class label=1, shown as class label $c_1$. When both images x and x' are fed into the watermark classifier Q 114, the watermark label w has a sharp decrease in the score of class label=3 ($c_3$) and a strong increase in the score of class label=1 ($c_1$). FIG. 3B is a diagram illustrating tables that show watermark labels w 304 generated using watermark classifier Q 114 that receives clean and adversarial data, according to an embodiment. Table 1 in FIG. 3B illustrates the watermark labels w generated by watermark classier Q 114 and clean data that includes image x. Table 2 illustrates the watermark labels w generated by watermark classier Q 114 and adversarial data used in the FGSM attack that includes image x'. Table 2 also illustrate that the adversarial data caused scores in class label=3 ($c_3$) to decrease and scores in class label=1 ($c_1$) to increase.

In an embodiment, the class labels c 208 generated by the honeypot classifier H 112 should not correlate to the watermark labels w 304 generated by watermark classifier Q 114. This is because the watermark classifier Q 114 should only apply to watermarks in watermark dataset W 206 and not to data in dataset D 204. Accordingly, when the class labels c 208 for honeypot classifier H 112 and watermark labels w 304 generated by watermark classifier Q 114 are correlated, the correlation may indicate that an input sample, e.g. image x' is an adversarial sample.

Going back to FIG. 1, in an embodiment, WAH module 110 may include a separate classifier S 116. The separate classifier S 116 may classify the output of the watermark classifier Q 114 (the watermark labels w 304) to indicate whether the input sample is a clean sample (e.g. image x) or an adversarial sample (e.g. image x').

Figure 4:
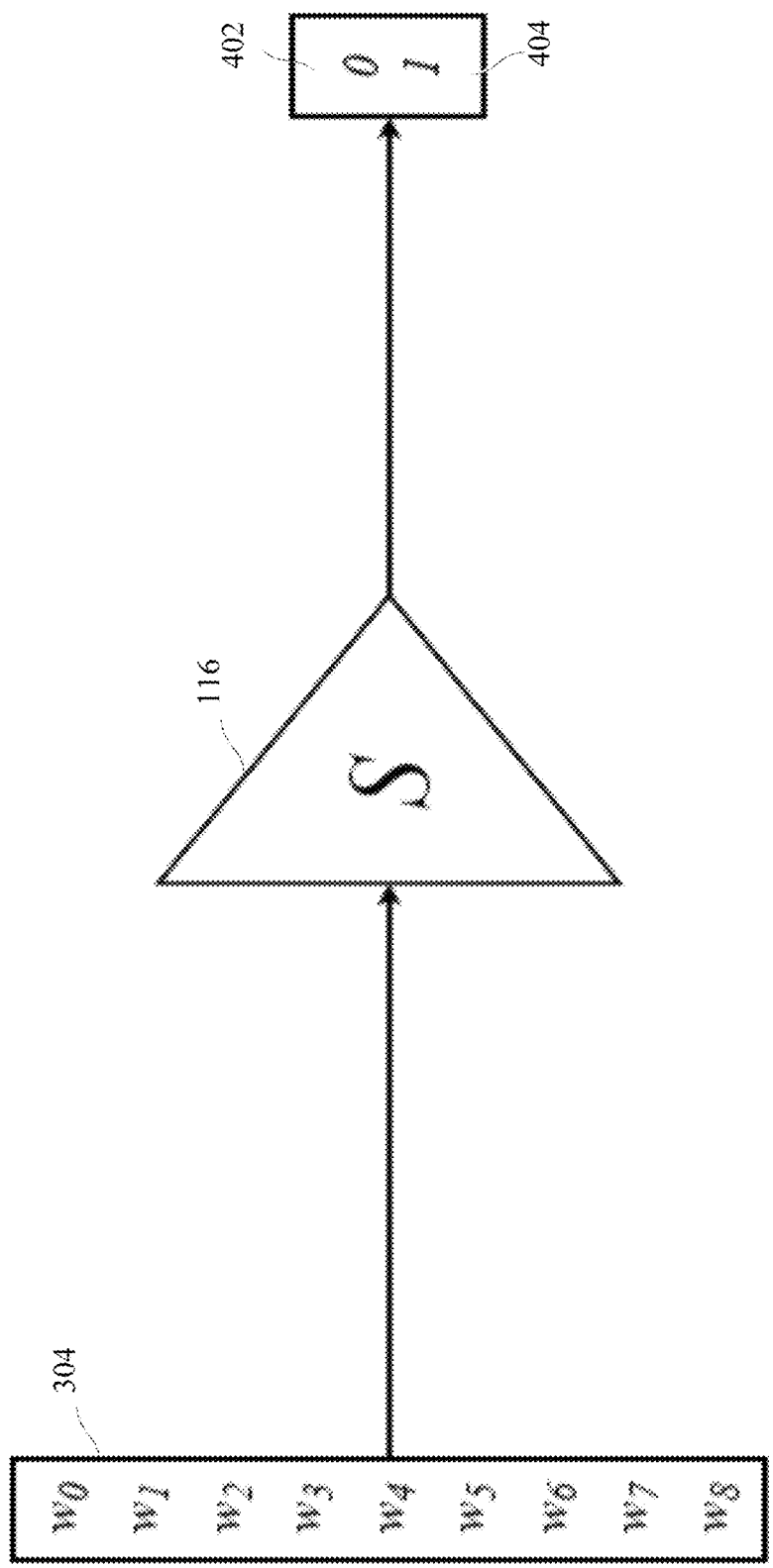
FIG. 4 is a block diagram of a separate classifier, according to an embodiment.

FIG. 4 is a block diagram 400 of a separate classifier, according to an embodiment. As illustrated in FIG. 4, separate classifier S 116 may receive watermark labels w 304 and detect whether the watermark labels w 304 are associated with a clean sample or adversarial sample. The classification may be a binary classification that classifies the watermark labels w 304 into a class label that is zero (402) or one (404). Notably, either the clean sample or adversarial sample may have values that are zero or one or vice versa. The structure of separate classifier S 116 is discussed further in FIG. 10.

In some embodiments, separate classifier S 116 may be trained using watermark labels w 304 generated from one or more datasets. Example datasets may include a dataset with images made of random noise, a CIFAR-10 dataset, a MNIST dataset and data from the MNIST dataset that was perturbed into adversarial samples. A trained separate classifier S 116 may identify that watermark labels w 304 generated using data from the random noise, CIFAR-10, and MNIST datasets are generated from clean samples because they are classified with a class label 402. The trained separate classifier S 116 may also identify that watermark labels w 304 generated using the adversarial samples that are based on the MNIST dataset are adversarial samples because they are classified with a class label 404.

Going back to FIG. 1, in another embodiment, adversarial samples may be identified using ensemble module 118 of WAH module 110. Ensemble module 118 may include m pairs of honeypot classifier H 112 and watermark classifier Q 114, where m is an integer greater than zero. Each pair of honeypot classifier H 112 and watermark classifier Q 114 may be trained using the same dataset D 204 but a different watermark dataset $W_j$. Different watermark datasets W have different watermarks that correspond to different watermark labels w 304. Ensemble module 118 aggregates (e.g. summation of average) the output of honeypot classifiers H 112 from pairs m. The output of the honeypot classifiers H 112 may be represented as $$H(x) = \frac{1}{m}\sum_{j=1}^{m} H_j(x).$$

In this case, if an attack perturbs a data sample into an adversarial sample e.g. image x', the sample may be "infected" using most of the watermarks. Because the training datasets D 204 and W 206 for honeypot classifier H 112 and watermark classifier Q 114 pairs are randomly initialized, a chance that a clean image x has a very similar score of $w_i$ in watermark class 304 across all watermark classifiers Q 114 in pairs m is low. Accordingly, ensemble module 118 may detect an adversarial attack by identifying unusually low or high scores which are consistent across all watermark classifiers Q 114 $i$ pairs m.

In some embodiments, the WAH module 110 may defend against gradient and non-gradient based attacks. In the gradient-based attacks, adversarial samples (e.g. images x' are generated using the gradient of a loss function with respect to the input sample (e.g. image x). However, since the honeypot classifier H 112 is trained using the dataset D 204 and watermark dataset W 206, the classifier class $c_i$ shares the same loss function and the same gradient as the respective watermark class wt. Thus, when the attacker uses gradient information to increase or decrease a score of a certain class $c_i$, the respective score for the watermark class $w_i$ will also change in same direction.

For example, suppose in an untargeted attacked version of the FGSM, the adversarial sample x' is created using the sign of the gradient function:

$$x'=x+\epsilon \cdot \text{sign}(\nabla_x J(x, y_{true}))$$

where $y_{true}$ is both the true label of sample x and the label associated of the associated watermark class. While the attack adds a noise scaled by E to decrease the score of $y_{true}$, the attack also perturbs sample x in the opposite direction of the watermark class of $y_{true}$. When feeding the adversarial sample x' into the watermark classifier Q 114, the score of class $y_{true}$ would also be lower. Thus, the adversarial sample x' may be identified as adversarial as discussed above.

In another example, suppose in a targeted attack version of the FGSM, the adversarial sample x' is created using J (x, $y_{target}$) where $y_{target}$ is the class $c_i$ that the attack wants the adversarial sample x' to pretend to be. In this case, the adversarial sample x' may be represented as follows:

$$x'=x-\in \cdot sign(\nabla_x J(x,y_{target}))$$

The $y_{target}$ is also the label of the associated watermark class $w_i$ of the target class. While this attack adds a noise scaled by E to increase the score of $y_{target}$, the attack also perturbs sample x in the same direction of the watermark class $w_i$ of $y_{target}$. When feeding the adversarial sample x' into the watermark classifier Q 114, the score of class $y_{target}$ would also be higher. Thus, the adversarial sample x' may be identified as an adversarial sample as discussed above.

In a non-gradient based attack, the generated adversarial sample x' may successfully increase the score of a target class $c_i$ either because the sample possesses features of the data class $d_i$ or features of the watermark class wt. However, the fitness function may not be able to distinguish between these two scenarios and the selection function may not be able to remove the samples with traits of watermarks. Accordingly, the adversarial samples may be detected by the watermark classifier Q 114.

In some embodiments, the computing device 102 may include a watermark generator 120. Watermark generator 120 may be included on the same or different computing device 102 as WAH module 110. Watermark generator 120 may be stored in a secure memory of computing device 120.

In some embodiments, watermark generator 120 may generate watermarks in watermark dataset W 206. Further, watermark generator 120 may generate watermark datasets $W_j$ from a dataset distribution based on a secret. The secret may be stored separately and securely from WAH module 110. In some embodiments, the secret may be defined as mean vectors of N non-overlapping standard multi-variable gaussian distributions in a space, where N is a positive integer. For each standard multivariate gaussian distribution, there may be a unique class ID from [1, ..., N].

Figure 5:
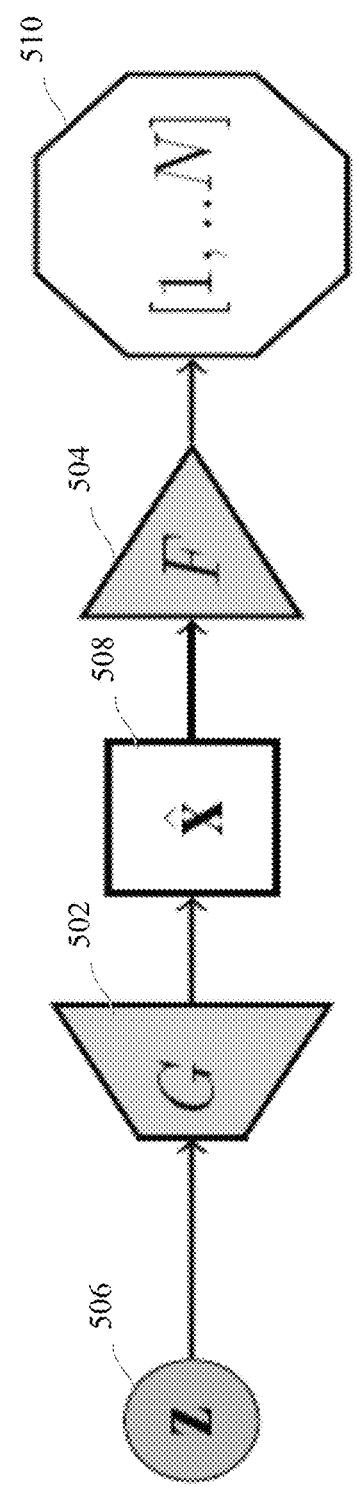
FIG. 5 is a block diagram of a watermark generator, according to an embodiment.

In some embodiments, watermark generator 120 may randomly draw the vectors from these non-overlapping distributions to generate a watermark dataset Wand use the class ID that corresponds to each distribution as the class ID of the corresponding generated watermark dataset W. FIG. 5 is a block diagram 500 of watermark generator 120, according to an embodiment. Watermark generator 120 includes a generator neural network G 502 (or generator G 502) and a classifier neural network F 504 (or watermark classifier F 504). In some embodiments, generator G 502 may be a decoder with a structure further described in FIG. 8. Generator G 502 draws a latent vector $z \sim p_z(z)$ from an imposed prior non-overlapping standard multi-variable gaussian distribution to generate a watermark $\hat{x}$. Multiple latent vectors z are shown as latent vectors z 506 and multiple watermarks $\hat{x}$ generated using generator G 502 are shown as watermarks $\hat{x}$ 508. Classifier F 504 receives watermarks $\hat{x}$ 508 and generates a soft label 510 for each watermark $\hat{x}$ in watermarks $\hat{x}$ 508. The soft label 510 is the class ID that corresponds to latent vector z.

During training, watermark generator 120 learns the mapping from the latent vectors z 506 to their class IDs and thus their corresponding soft labels 510. The generator G 502 learns to generate watermarks $\hat{x}$ 508 that contain enough information to be classified by the classifier F 504 into soft labels 510.

In some embodiments, classifier F 504 may have the same structure as honeypot classifier H 112. This ensures that the watermarks $\hat{x}$ 508 generated using generator G 502 can be classified by honeypot classifier H 112. Further, because classifier F 504 and honeypot classifier H 112 have the same structure, honeypot classifier H 112 may be initialized using the trained classifier F 504.

Figure 6:
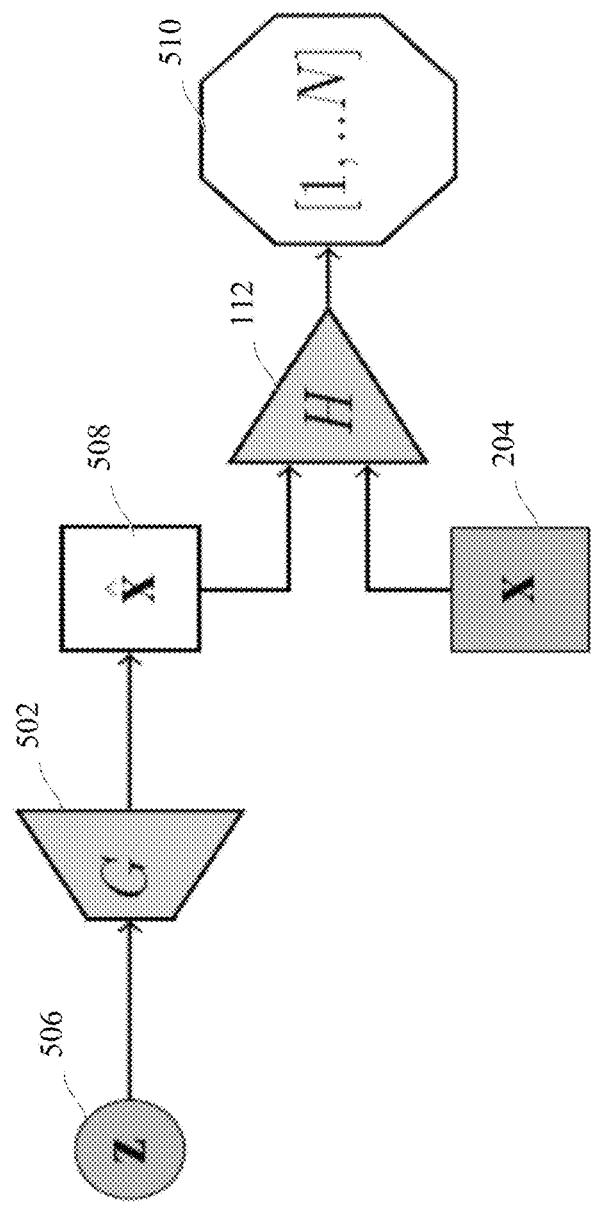
FIG. 6 is a block diagram of a joint training system that includes a watermark generator and a honeypot classifier, according to an embodiment.

FIG. 6 is a block diagram 600 of a joint training system that includes a watermark generator and a honeypot classifier, according to an embodiment. As discussed above, classifier F 504 may have the same structure as honeypot classifier H 112. This means that generator G 502 and honeypot classifier H 112 may be trained using a joint training process. In the joint training process, generator G 502 may generate watermarks $\hat{x}$ 508. Honeypot classifier H 112 may be trained using a data sample x from the clean dataset D 204 (the clean dataset) and watermarks $\hat{x}$ 508 in watermark dataset 206. In some instances, honeypot classifier H 112 may be trained using the same number of samples x in dataset D 204 and watermarks $\hat{x}$ 508 to minimize the total classification loss. The training continues until generator G 502 generates watermarks $\hat{x}$ 508 that honeypot classifier H 112 correctly classifies into soft labels 510 (class labels c 208) with an error below an error threshold. The training also continues until honeypot classifier H 112 correctly classifies data samples x into soft labels 510 (class labels c 208) with an error below an error threshold. During each training iteration the weights in the layers of one or both of generator G 502 and honeypot classifier H 112 may be updated.

Once generator G 502 and honeypot classifier H 112 are trained using the approach in FIG. 6, generator G 502 may generate watermarks $\hat{x}$ 508 for watermark dataset W 206 that are able to be processed by honeypot classifier H 112 together with data in dataset D 204.

Figure 7:
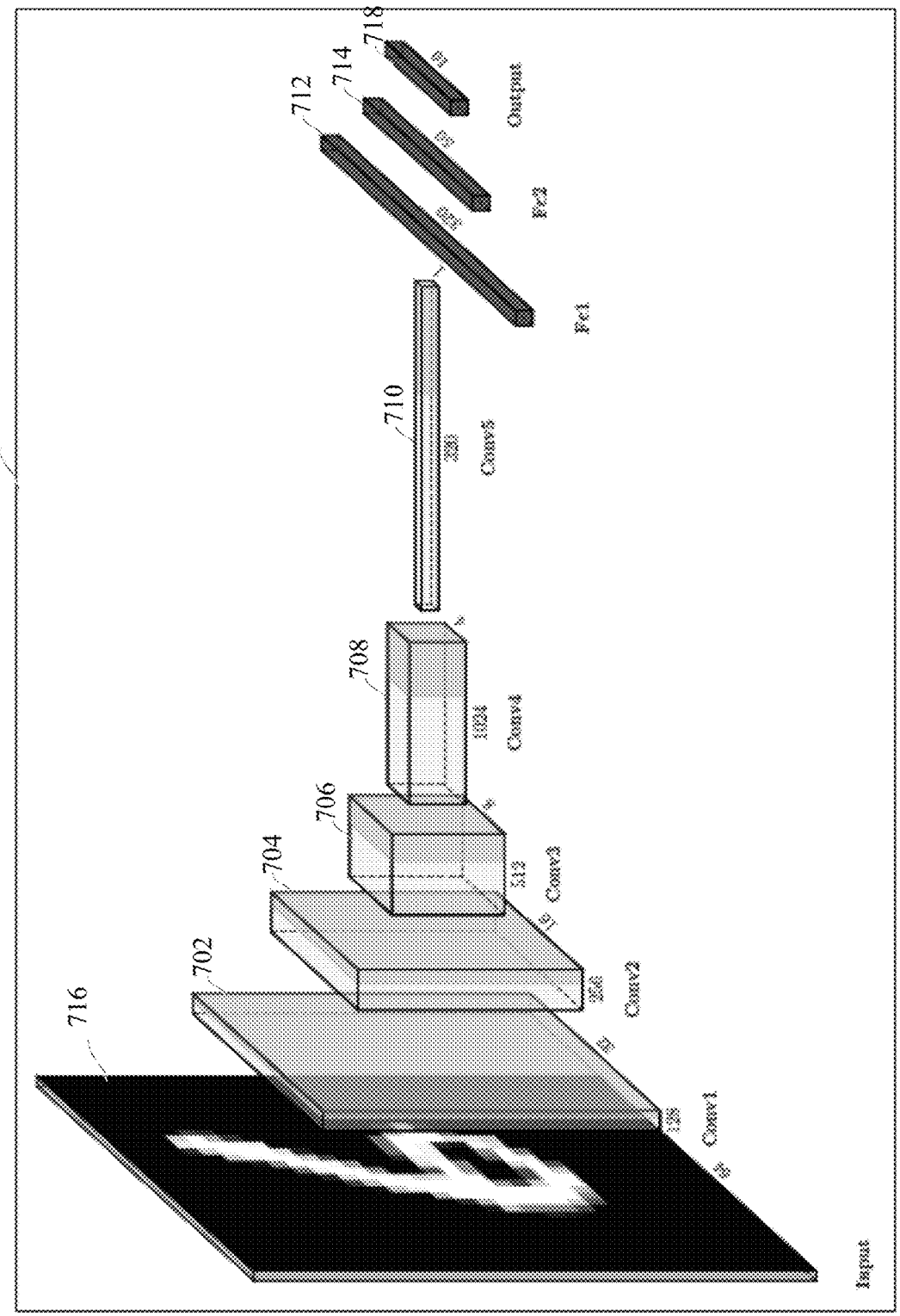
FIG. 7 is a block diagram of a neural network structure of a honeypot classifier, according to an embodiment.

FIG. 7 is a block diagram 700 of a neural network structure of a honeypot classifier H, according to an embodiment. Notably, the neural network structure is exemplary and honeypot classifier H 112 may also be implemented using other neural network structures. FIG. 7 illustrates that honeypot classifier H 112 may be implement as a convolutional neural network that includes five convolutional layers 702-710 and two fully connected layers 712 and 714. In some embodiments, layer 702 may have dimensions (width× height×depth) that are 32×32×128, layer 704 may have dimensions that are 16×16×256, layer 706 may have dimensions that are 8×8×512, and layer 708 may have dimensions that are 4×4×1024. Also, in some embodiments, fully connected layer 712 may have dimensions that are 320×1×1 and fully connected layer 714 may be 50×1×1. Notably, the dimensions of convolutional layers 702-710 are exemplary and are used to illustrate the convolutional structure of honeypot classifier H 112. Honeypot classifier H 112 may also include convolutional layers 702-710 with other dimensions.

In some embodiments, layer 702 may receive image 716, which may be sample x or adversarial sample x'. Honeypot classifier H 112 may pass image 716 through convolutional layers 702-710 and fully connected layers 712-714 to generate an output tensor 718. Output tensor 718 may be one of class labels c 208.

As illustrated in FIG. 7, image 716 may have a resolution that is 64×64 (width×height) pixels. For a greyscale image 716, the image shape may be 64×64×1 and for color image 716 the image shape may be 64×64×3. As shown in FIG. 7, after image 716 passes through the convolutional layers 702-710, image 716 may be converted into a feature map that is 1×1×320. Notably, the dimensions of fully connected layers 712-714 are exemplary. Honeypot classifier H 112 may also include fully connected layers 712-714 with other dimensions.

In some embodiments one or more convolution layers 702-710 may use a rectifier linear unit (ReLU) as an activation function. The ReLU may output the input if the input is a positive input and a zero if an input is not a positive input. In a further embodiment the ReLU may be a Leaky ReLU that outputs a small positive gradient (instead of a zero) when the input is not positive.

In some embodiments, batch normalization layers (not shown) may also be inserted between each one of layers 702-710. The batch normalization layers may reduce the covariance coverage shift in the output of each layer 702-710.

In some embodiments, after convolutional layers 702-710 convert image 716 into a feature map, the feature map may be passed through fully connected layers 712-714, which determine output tensor 718. In some embodiments, one or both fully connected layers 712-714 may use a ReLU (or a Leaky ReLU) as an activation function and a Dropout technique. In a Dropout technique, during training honeypot classifier H 112 may ignore the weight of one or more neurons at each fully connected layer 712 or 714.

As discussed above, output tensor 718 corresponds to class labels c 208. In some embodiments, output tensor 718 may correspond to the number of classes in the dataset D 204 and watermark dataset W 206.

Figure 8:
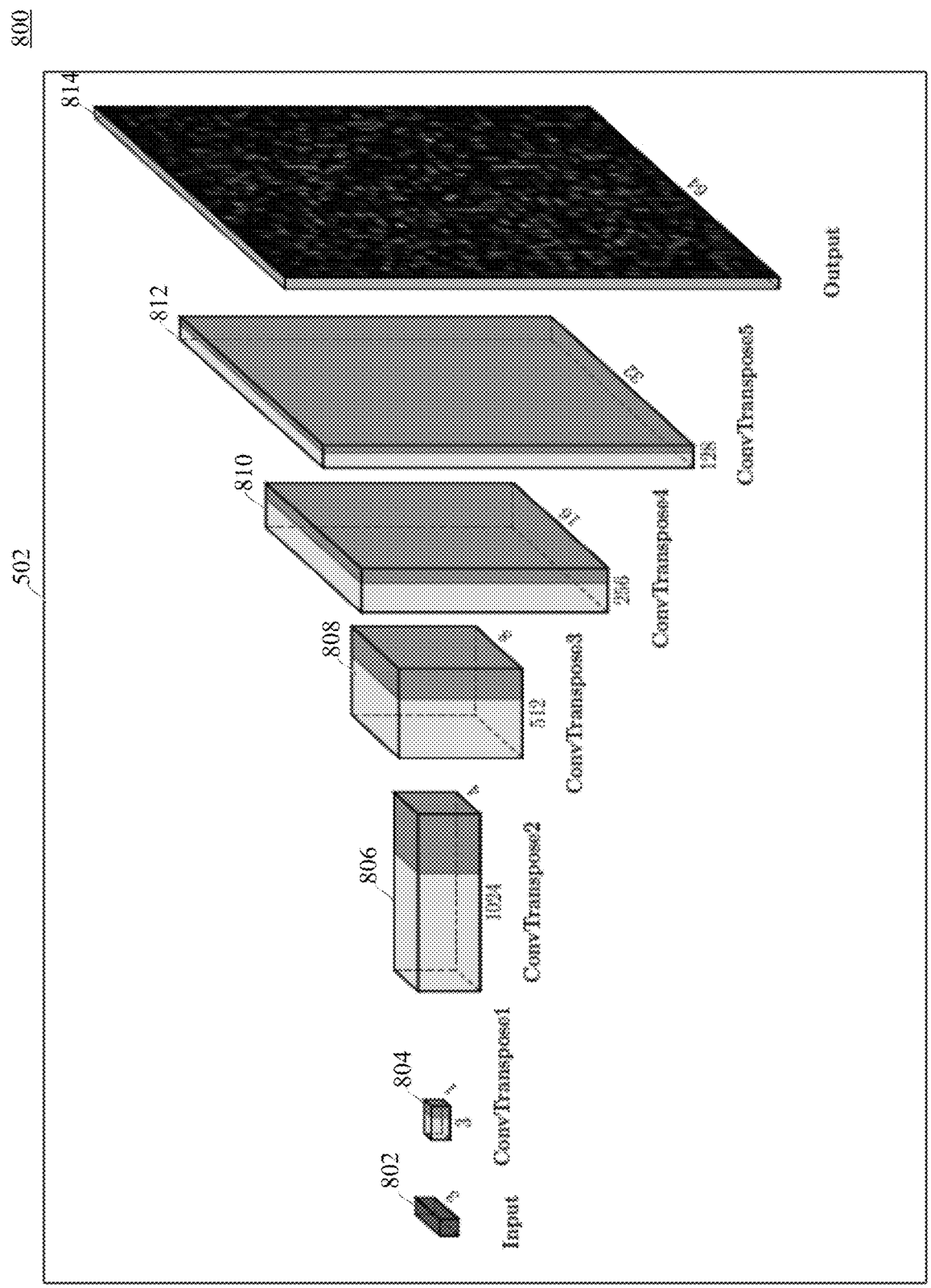
FIG. 8 is a block diagram of a neural network structure of a generator in watermark generator that generates watermarks, according to an embodiment.

FIG. 8 is a block diagram 800 of a neural network structure of a generator G in watermark generator, according to an embodiment. Notably, the neural network structure is exemplary and generator G 502 may also be implemented using other neural network structures. In some embodiments, generator G 502 may receive input 802. Input 802 may be one of latent vectors z 506. In some embodiments, input 802 may be a 1-D tensor of size 3. Input 802 may represent the coordinate of a point in the three-dimensional space.

Input 802 may be randomly selected from one of non-overlapping standard multivariate gaussian distributions. In some embodiments there may be ten non-overlapping standard multivariate gaussian distributions in this three-dimensional space from which input 802 may be selected. Each of the distributions may correspond to a class of watermarks 304.

In some embodiment, generator G 502 may be a deconvolutional neural network or a decoder that includes five deconvolutional layers 804-812. The output of the deconvolutional layer 812 is an output tensor 814 and is an output of an image that is a watermark. In some embodiments, the image of a watermark may have a resolution that is 64×64×1 for a greyscale watermark and that is 64×64×3 for a color watermark.

In some embodiments, deconvolutional layer 804 may have dimensions that are 1×1×3 (width×height×depth), deconvolutional layer 806 may have dimensions that are 4×4×1024, deconvolutional layer 808 may have dimensions that are 5×5×512, deconvolutional layer 810 may have dimensions that are 16×16×246, and deconvolutional layer 812 may have dimensions that are 32×32×128. Notably, the dimensions of deconvolutional layers 804-812 are exemplary and are used to illustrate the deconvolutional structure of generator G 502. Generator G 502 may also include deconvolutional layers 804-812 with other dimensions.

In some instances, as with honeypot classifier H 112, generator G 502 may use a ReLU layer as an activation function for one or more deconvolutional layers 804-812. Also, similar to honeypot classifier H 112, batch normalization layers may be inserted between one or more deconvolutional layers 804-812 to reduce the covariate shift.

Figure 9:
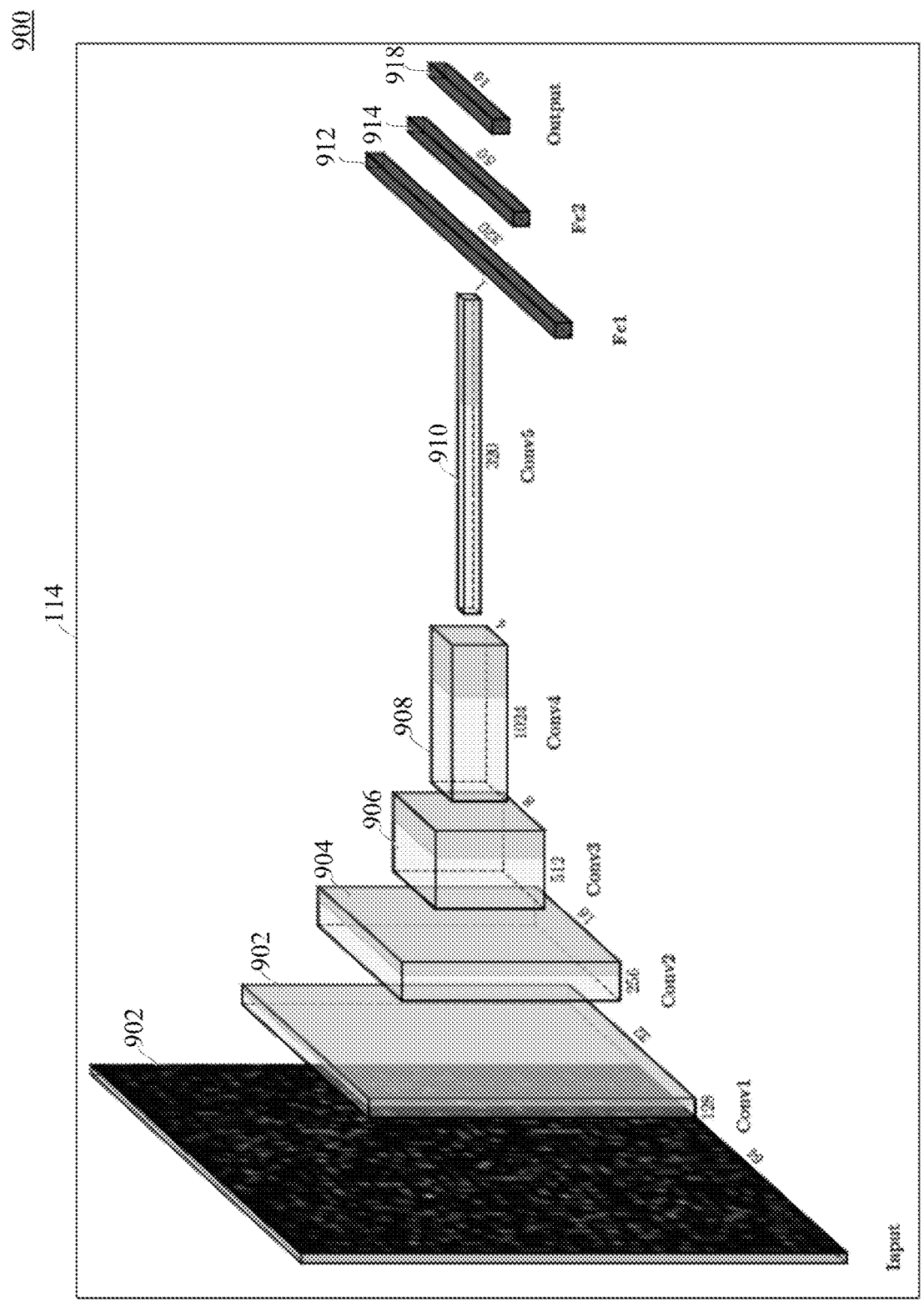
FIG. 9 is a block diagram of a neural network structure of a watermark classifier, according to an embodiment.

FIG. 9 is a block diagram 900 of a neural network structure of a watermark classifier Q, according to an embodiment. Notably, the neural network structure is exemplary and watermark classifier Q 114 may also be implemented using other neural network structures. Further, in some embodiments the structure of watermark classifier Q 114 may be the same as the structure of honeypot classifier H 112.

FIG. 9 illustrates that watermark classifier Q 114 may be implement as a convolutional neural network that includes five convolutional layers 902-910 and two fully connected layers 912 and 914. In some embodiments, layer 902 may have dimensions (width× height× depth) that are 32×32×128, layer 904 may have dimensions that are 16×16×256, layer 906 may have dimensions that are 8×8×512, layer 908 may have dimensions that are 4×4×1024, and layer 910 may have dimensions that are 1×1×32. Also, in some embodiments, fully connected layer 912 may have dimensions that are 320×1×1 and fully connected layer 914 may have dimensions that are 50×1×1. Notably, the dimensions of convolutional layers 902-910 are exemplary and are used to illustrate the convolutional structure of watermark classifier Q 114. Watermark classifier Q 114 may also include convolutional layers 902-910 with other dimensions.

Layer 902 may receive image 916, which may be a watermark $\hat{x}n$ watermark dataset W 206 or a clean data sample in dataset D 204. Watermark classifier Q 114 may pass image 916 through convolutional layers 902-910 and fully connected layers 912-914 to generate an output tensor 918. Output tensor 918 may be one of watermark labels w 304 for watermarks and may have dimension that is 10×1×1. Notably, the dimensions of fully connected layers 912-914 are exemplary. Watermark classifier Q 114 may also include fully connected layers 912-914 with other dimensions.

As illustrated in FIG. 9, image 916 may have a resolution that is 64×64 pixels. For a greyscale image 916, the mage shape may be 64×64×1 and for color image 916, the image shape may be 64×64×3. As shown in FIG. 9, after image 916 passes through convolutional layers 902-910, image 916 may be converted into a feature map that is 1×1×320.

In some embodiments one or more convolution layers 902-910 may use a ReLU or a Leaky ReLU. Also, in some embodiments, batch normalization layers (not shown) may be inserted between each one of layers 902-910. The batch normalization layers may reduce the covariance coverage shift in the output of each layer 902-910.

In some embodiments, after convolutional layers 902-910 convert image 916 into a feature map, the feature map may be passed through fully connected layers 912-914, which determine output tensor 918. In some embodiments, one or both fully connected layers 912-914 may use a ReLU (or a Leaky ReLU) as an activation function and a Dropout technique. As discussed above, output tensor 918 corresponds to watermarks labels w 304.

Figure 10:
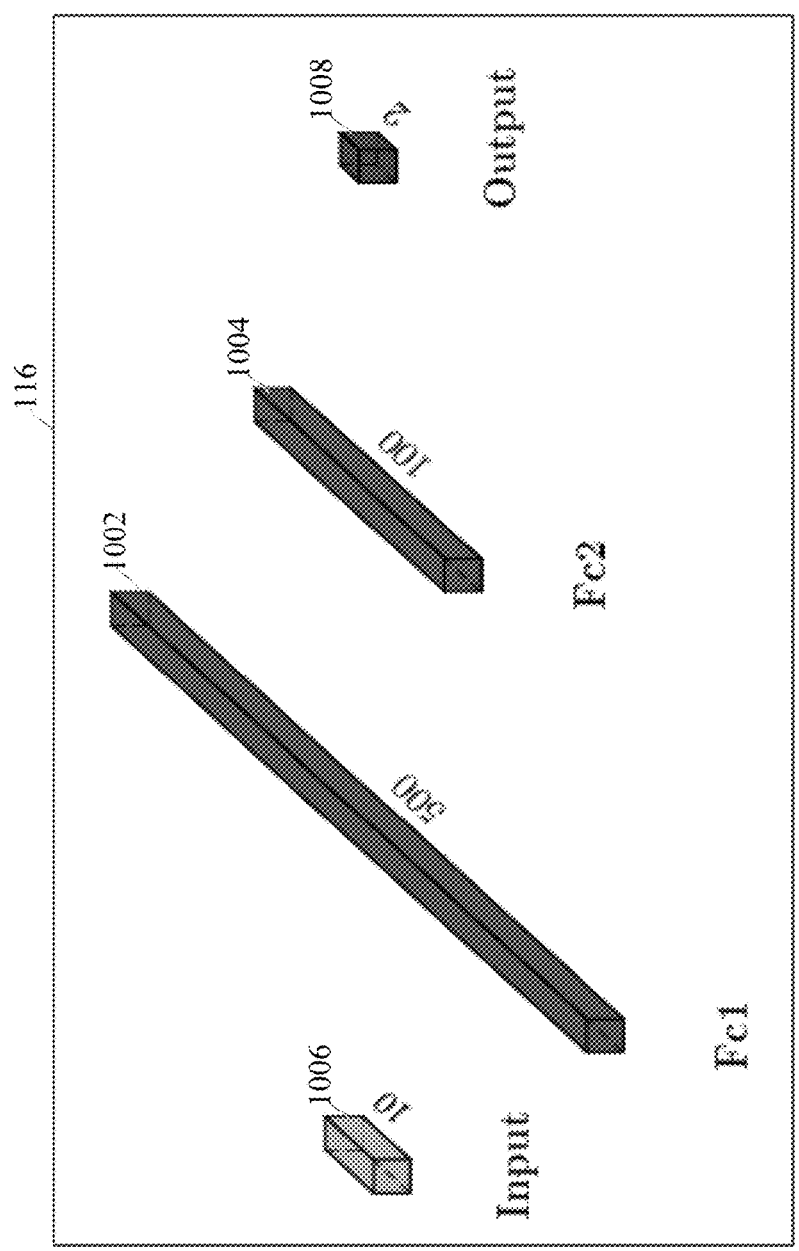
FIG. 10 is a block diagram of a neural network structure of a separate classifier, according to an embodiment.

FIG. 10 is a block diagram 1000 of a neural network structure of a separate classifier S, according to an embodiment. As discussed above, separate classifier S 116 distinguishes clean data samples in dataset D 204 (e.g. image x) and adversarial data samples (e.g. image x'). Notably, the neural network structure of separator classifier S 116 is exemplary and separate classifier S 116 may also be implemented using other neural network structures.

FIG. 10 illustrates that separate classifier S 116 may be implement as a binary classifier that includes two fully connected layers 1002 and 1004. In some embodiments, layer 1002 may have dimensions (width×height×depth) that are 500×1×1 and layer 1004 may have dimensions that are 100×1×1. Notably, the dimensions of fully connected layers 1002-1004 are exemplary. Separate classifier S 116 may also include fully connected layers 712-714 with other dimensions but that produce a binary output 1008.

Layer 1002 may receive input 1006 which may be one of watermark labels w 304. Input 1006 may have a resolution that is 10×1×1. Separate classifier S 116 may pass input 1006 through fully connected layers 1002 and 1004 to generate a binary output 1008. The binary output 1008 may have values that are zero and one, which corresponds to whether the watermark label that separate classifier S 116 classified is a clean data sample (e.g. image x) or an adversarial data sample (e.g. image x').

Going back to FIG. 1, as discussed above, watermark labels w 304 may also be detected using an ensemble of honeypot classifier H 112 and watermark classifier Q 114 pairs in ensemble module 118. Suppose, there are ten honeypot classifier H 112 and watermark classifier Q 114 pairs in the ensemble module 118. Suppose further that a threshold $\Delta$ is used to determine a high or low score and a therashold $\delta$ is used to measure similarity of the score of the class label in class labels c 208 and watermark labels 304. Further, the score of class i from the jth watermark detector $Q_j$ may be $w_{ij}$. The formula below may determine that the sample as an adversarial sample if:

$$\exists i \left( \frac{1}{j} \sum_{j=1}^{m} w_{ij} < \Delta \vee \frac{1}{j} \sum_{j=1}^{m} w_{ij} > 1 - \Delta \right)$$

$$\wedge \left( \forall j \in \{1, \ldots m\}, \frac{1}{j} \sum_{j=1}^{m} w_{ij} - \delta < w_{ij} < \frac{1}{j} \sum_{j=1}^{m} w_{ij} + \delta \right)$$

With reference to FIGS. 2 and 3A, honeypot classifier H 112 of FIG. 2 is trained so that one class of watermarks in watermark dataset W 206 is linked to one fixed class in data in dataset D 204. In this way, when adversarial samples are fed into both the honeypot classifier H 112 and watermark classifier Q 114, the class labels c 208 produced by honeypot classifier H 112 and watermark labels w 204 produced by watermark classifier Q 114 may have positive correlation. In an un-targeted attack, the score of the victim class may show a decrease in the output vectors from both honeypot classifier H 112 and watermark classifier Q 114. In a targeted attack, the score of the target class may show an increase in both output vectors produced by honeypot classifier H 112 and watermark classifier Q 114. However, in the targeted and untargeted attacks the change of the score for a single class produced by honeypot classifier H 112 and watermark classifier Q 114 may be below an observable threshold.

In some embodiments, the accuracy with which WAH module 110 may detect an attack may be improved when honeypot classifier H 112 is linked to multiple class labels c 208 and watermark labels w 304. In this way, multiple watermark labels w 304 may show signs of perturbation caused by the adversarial samples. This may be achieved by binding a watermark class label $w_i$ in watermark labels w 304 to a data class label $c_i$ in class label c 208. In some embodiments, the binding may be such that watermark class label $w_i$ is negatively correlated to data class label $c_i$, but positively correlated to some or all other data class labels in c 208 other than ct. This may be achieved using a loss function that trains honeypot classifier H 112, such that identifying watermark class label $w_i$ that is the same class as class label $c_i$ adds to the cost, while identifying watermark class label $w_i$ as any class other than class label $c_i$ reduces the cost.

When honeypot classifier H 112 is trained using the loss function discussed above, an untargeted attack may cause honeypot classifier H 112 to produce a burst of the score in the victim class labelled with class label $c_i$ and a decrease of score of some or all other classes that are not labeled ct. During a targeted attack, honeypot classifier H 112 may generate increased scores of every class other than the target class with the class label $c_i$, with a sharp decrease in the score of the target class with class label ct. In this way, the scores in all or most classes may be used to identify a targeted attack instead of only the scores in the targeted class.

Figure 11:
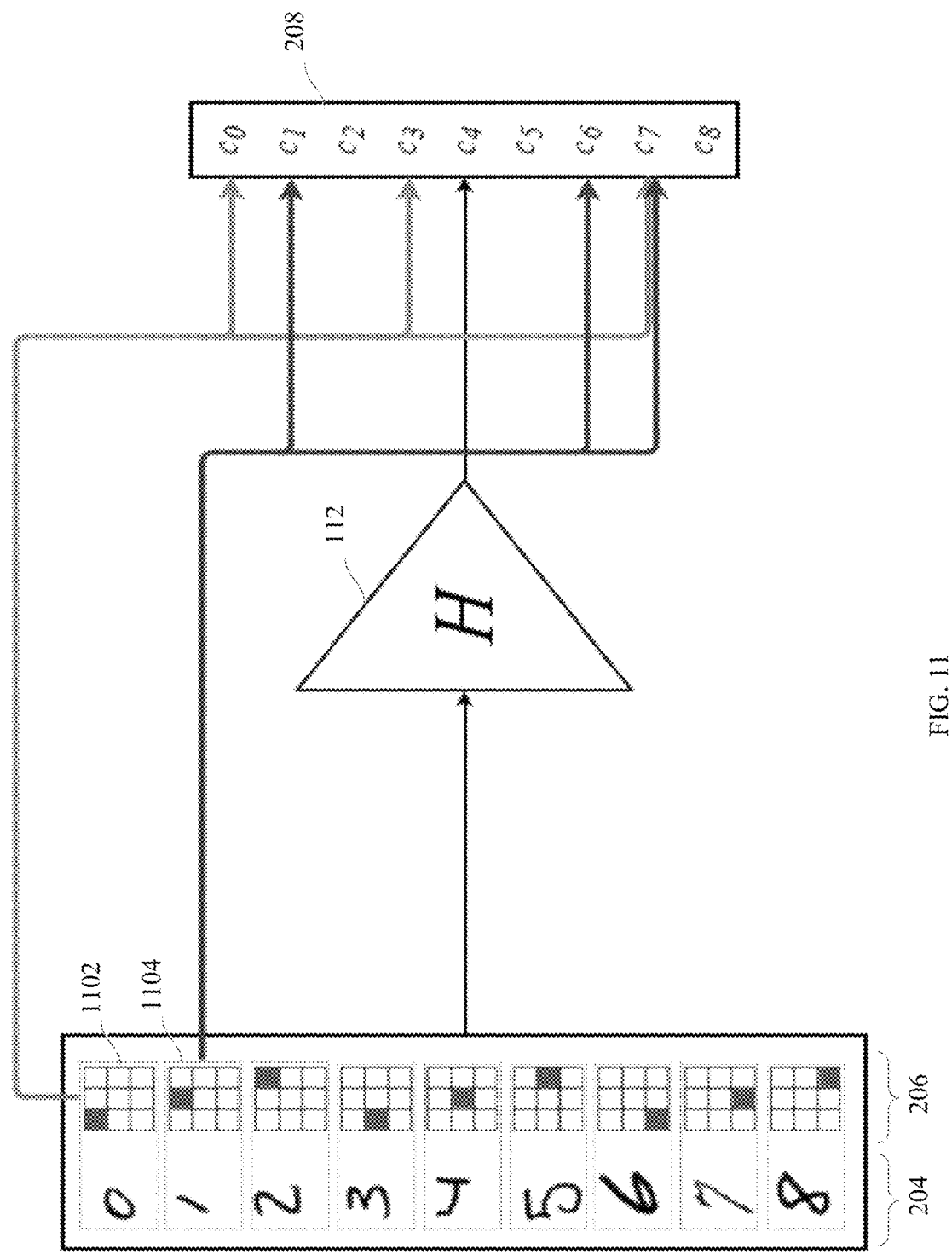
FIG. 11 is a block diagram of a multiple watermark honeypot classifier according to an embodiment.

Another technique that may increase accuracy when identifying an attack is multiple watermarking. FIG. 11 is a block diagram 1100 of a honeypot classifier with multiple watermarking, according to an embodiment. As illustrated in FIG. 11, honeypot classifier H 112 may be trained to correlate a watermark to a subset of classes. For example, watermark $w_o$ 1102 in watermark dataset 304 may correlate to classes having class labels $c_o$, $c_3$, and $c_7$ in class labels 208. In another example, watermark $w_i$ 1104 in watermark dataset 304 may correlate to classes having class labels $c_1$, $c_6$, and $c_7$ in class labels 208. In this way, when an attacker in a targeted attack attempts to cause honeypot classifier H 112 to increase the score of $c_7$, the watermark classifier Q 114 may produce increased scores for watermark class labels $w_0$ and $w_1$. Because the attack may be identified using multiple watermarks, instead of just one watermark, honeypot classifier H 112 trained on multiple watermarks achieves a more accurate and robust attack detection.

In some embodiments, watermarks in watermark dataset W 206 may be allocated to a subset of data classes using an error correction code (ECC). The ECC may maximize the difference in signals between different target and victim classes. In this way, the property of the attack, e.g. whether an attack is a targeted or a non-targeted attack, may be detected and a full recovery of the correct class may also be achieved.

Figure 12:
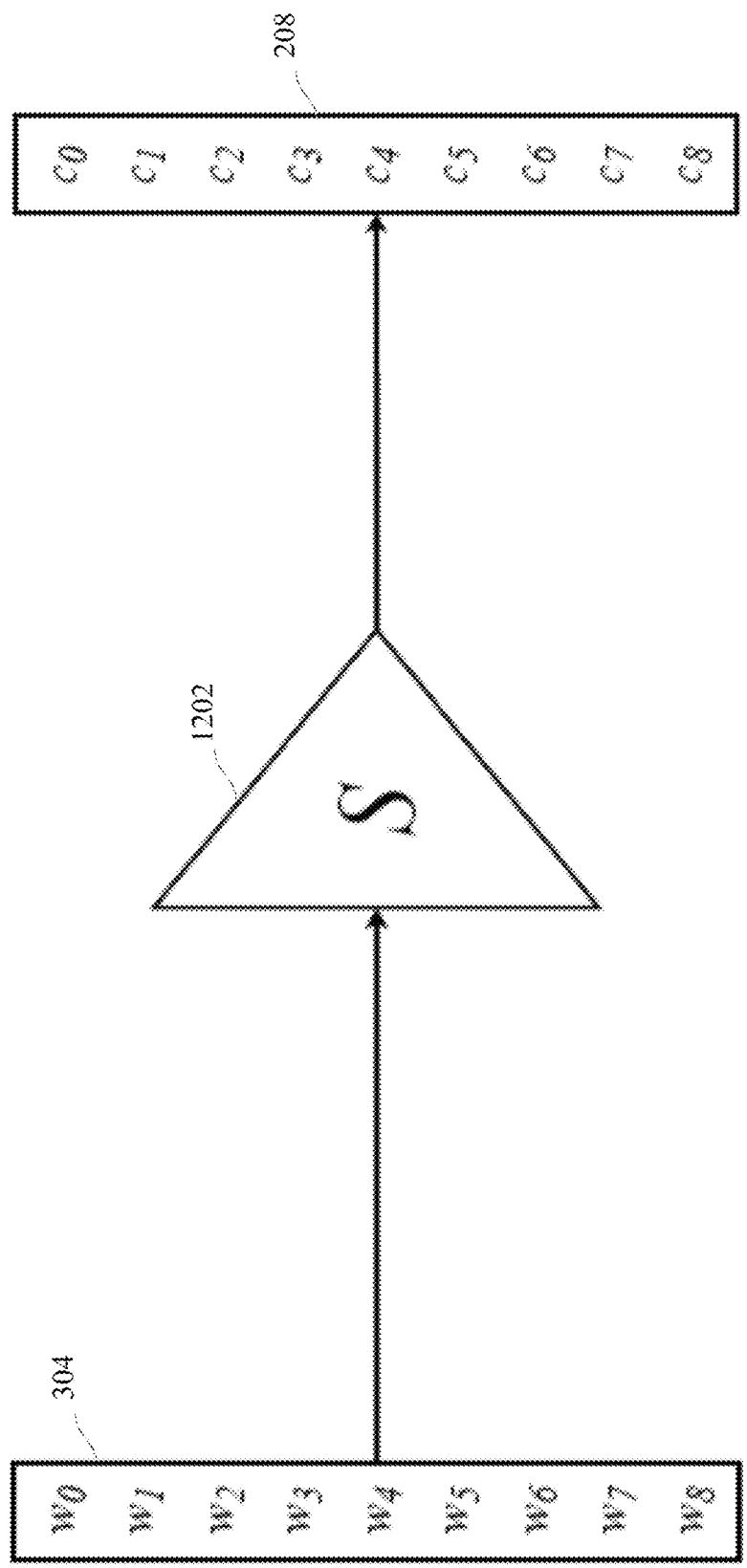
FIG. 12 is a block diagram of a separator classifier that generates clean samples, according to an embodiment.

Going back to FIG. 2, one way to recover and identify a correct class (e.g. class associated with class labels c 208 that honeypot classifier H 112 may have produced with clean data) from the adversarial samples is to use a separator classifier that is trained to produce class labels 208 c from watermark labels w 204. FIG. 12 is a block diagram that illustrates of a separator classifier, according to an embodiment. As illustrated in FIG. 12, separator classifier S 1202 may be a separator classifier that is similar to separator classifier S 116, but that receives watermark labels w 304 and generates the correct class labels c 208 in an event of an attack. Separator classifier S 1202 may be included in WAH module 110 of FIG. 1 (not shown). In some embodiment, separator classifier S 1202 may be trained using watermark labels w 204 produced using watermark classifier Q 114.

Figure 13:
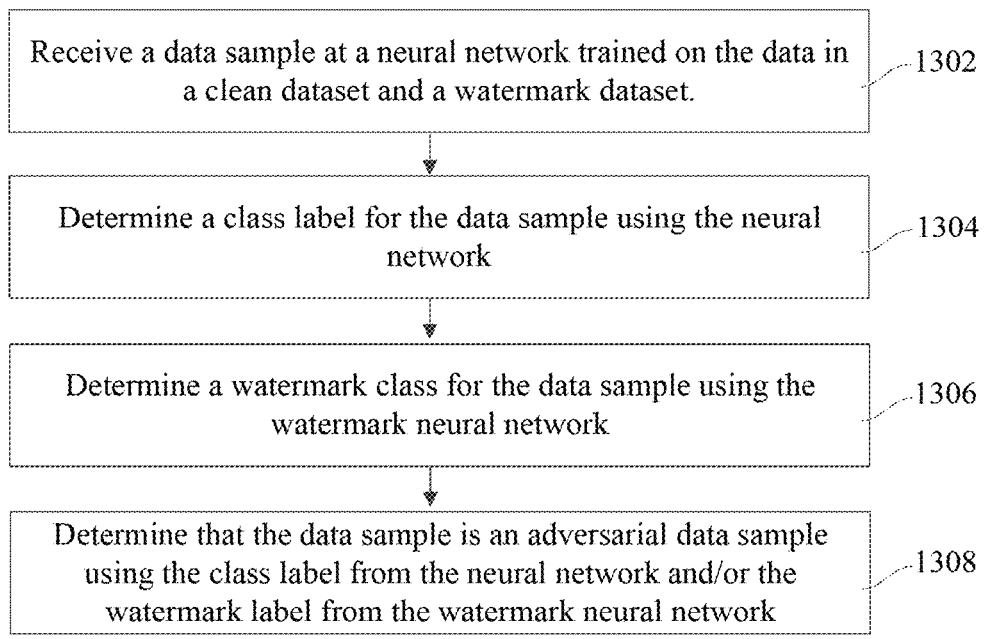
FIG. 13 is a flowchart of a method for identifying an adversarial sample, according to an embodiment.

FIG. 13 is a flowchart of a method 1300 for identifying an adversarial sample, according to an embodiment. Method 1300 may be performed using hardware and/or software components described in FIGS. 1-12. Note that one or more of the operations, which are described in more detail above, may be deleted, combined, or performed in a different order as appropriate.

At operation 1302 a data sample is received. For example, WAH module 110 receives a data sample that may either be a clean sample x from dataset D 204 or an adversarial sample x'. As discussed above, WAH module 110 may include neural network 108 that is trained as honeypot classifier H 112 using data from dataset D 204 and watermarks from watermark dataset W 206.

At operation 1304, a class label is determined. For example, neural network 108 trained as honeypot classifier H 112 may determine class label $c_i$ of class labels c 208 of the data sample by passing the data sample received at operation 1302 through honeypot classifier H 112.

At operation 1306, a watermark label is determined. For example, watermark classifier Q 114 may determine watermark label $w_i$ of watermark labels w 304 of the data sample by passing the data sample received at operation 1302 through watermark classifier Q 114.

At operation 1308, the data sample received at operation 1302 is determined as an adversarial data sample or a clean data sample based on the class label $c_i$ and/or watermark label $w_i$. For example, WAH module 110 may determine that the data sample is an adversarial data sample based on a coupling between the lass label $c_i$ and watermark label $w_i$. In another example, the watermark label $w_i$, may be passed through separator classifier S 116 that may identify the data sample associated with the watermark label $w_i$ as an adversarial data sample. In yet another example, if honeypot classifier H 112 and watermark classifier Q 114 are part of ensemble module 118 that includes m honeypot classifier H 112 and watermark classifier Q 114 pairs, ensemble module 118 may determine that the data sample is an adversarial data sample by determining an unusually high or low score of the watermark labels wt. that are consistent across multiple watermark classifiers Q 114 as compared to the class labels ct.

Figure 14:
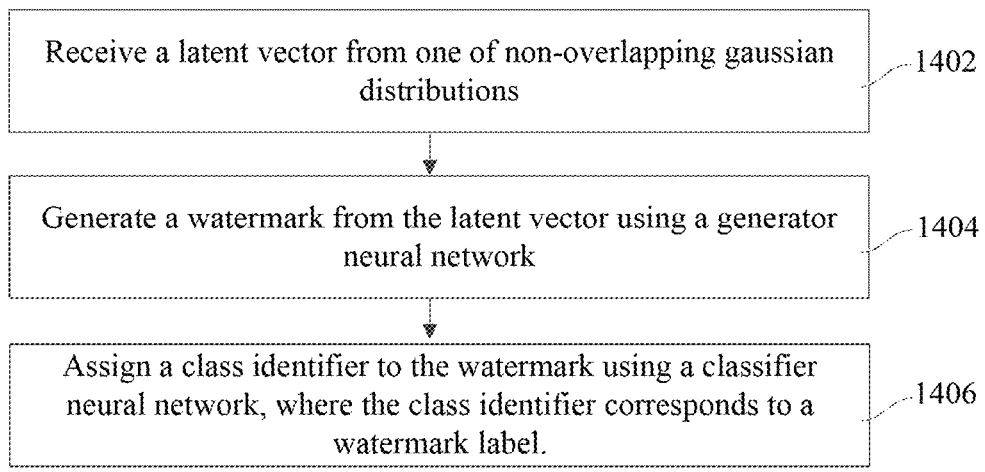
FIG. 14 is a flowchart of a method for generating a watermark dataset, according to an embodiment.

FIG. 14 is a flowchart of a method 1400 for generating a watermark dataset, according to an embodiment. Method 1400 may be performed using hardware and/or software components described in FIGS. 1-12. Note that one or more of the operations, which are described in more detail above, may be deleted, combined, or performed in a different order as appropriate. In some embodiments, method 1200 may repeat until a threshold number of watermarks to be included in watermark dataset W 206 is generated.

At operation 1402, a latent vector is identified. For example, generator G 502 may receive a latent vector z from a non-overlapping distribution gaussian distribution. In some embodiments there may be a preconfigured number of non-overlapping distribution gaussian distributions from which a latent vector z may be generated.

At operation 1404, a watermark a generated. For example, generator G 502 may generate a watermark $\hat{x}$ from the latent vector z.

At operation 1406, a class identifier is assigned to the watermark $\hat{x}$. For example, classifier F 504 may assign a class ID that corresponds to watermark label $w_i$ to watermark $\hat{x}$. The class ID may correspond to a classification, which may be one of soft labels 510.

Figure 15:
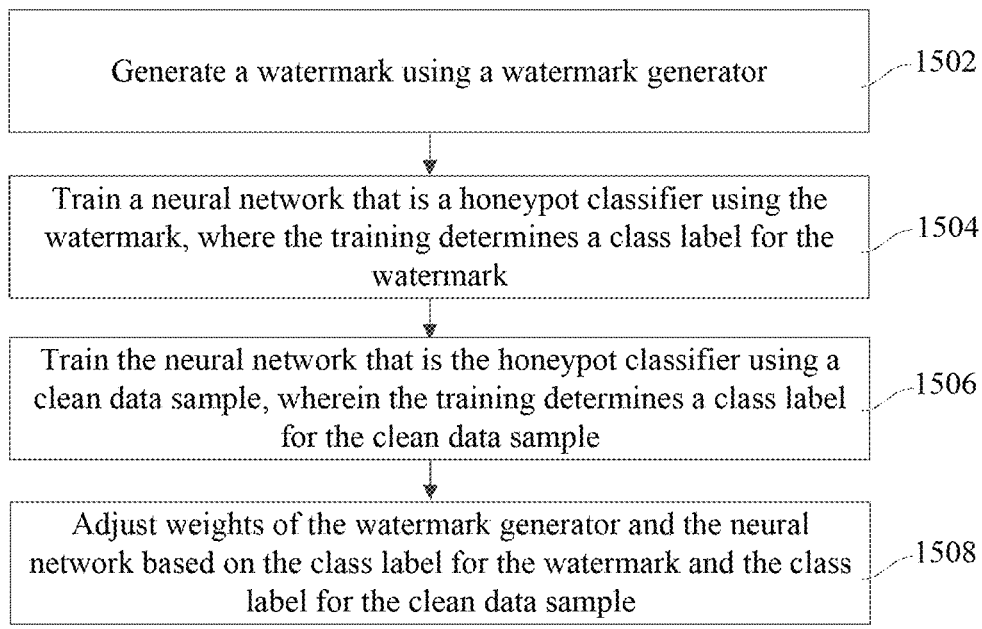
FIG. 15 is a flowchart of a method for a joint training mechanism for training a watermark generator and honeypot classifier, according to an embodiment.

FIG. 15 is a flowchart of a method 1500 for a joint training mechanism for training a watermark generator and a honeypot classifier, according to an embodiment. Method 1500 may be performed using hardware and/or software components described in FIGS. 1-12. Note that one or more of the operations, which are described in more detail above, may be deleted, combined, or performed in a different order as appropriate. In some embodiments, method 1500 may repeat until the generator G 502 and honeypot classifier H 112 are trained.

At operation 1502, the watermarks are generated. For example, generator G 502 generates a watermark $\hat{x}$ in watermarks $\hat{x}$ 508 for watermark dataset W 206. As discussed in FIG. 14, the watermark $\hat{x}$ is generated using latent vector z.

At operation 1504, a honeypot classifier is trained using watermark $\hat{x}$. For example, honeypot classifier H 112 receives watermark $\hat{x}$ and determines a class ID which is class label $c_i$ in class labels c 208 for the watermark $\hat{x}$.

At operation 1506, a honeypot classifier is trained using a data sample. For example, honeypot classifier H 112 receives a data sample from dataset D 204 and generates a class ID which is class label $c_i$ in class labels c 208 for the data sample.

At operation 1508, weights for generator G 502 and honeypot classifier H 112 are adjusted. For example, weights in one or more deconvolution layers 804-812 in generator G 502 and weights in one or more convolution layers 702-710 and/or fully connected layers 712-714 in honeypot classifier H 112 are adjusted. The weights may be adjusted based on the class label $c_i$ that was generated for the watermark $\hat{x}$ in operation 1304 and on the class label $c_i$ that was generated for the data sample from dataset D 204 in operation 1306.

Figure 16:
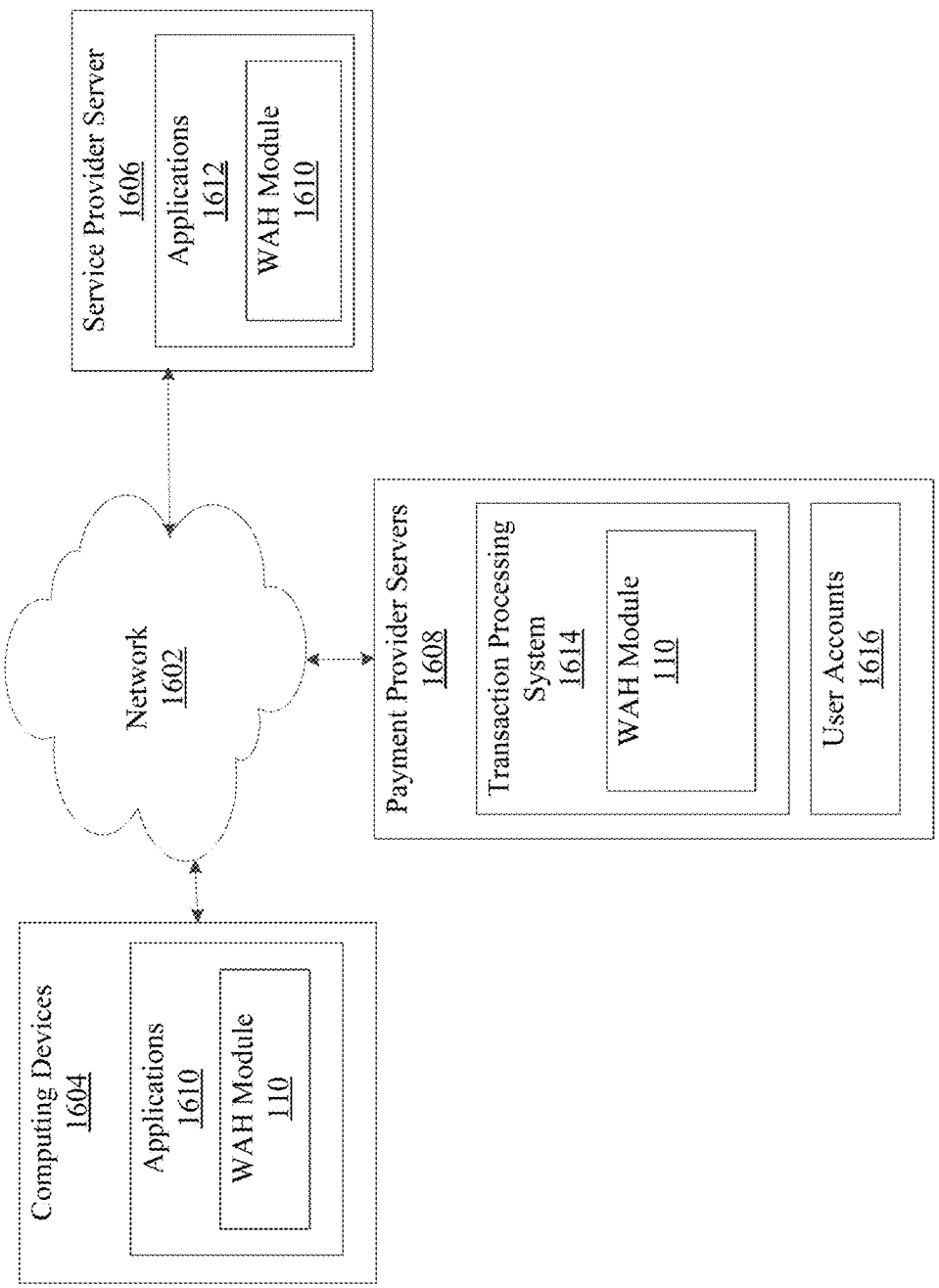
FIG. 16 is a block diagram of a computing system where neural networks can be implemented.

FIG. 16 is a block diagram of a computing system 1600 where neural networks can be implemented. System 1600 includes a network 1602. Network 1602 may be implemented as a single network or a combination of multiple networks. For example, in various embodiments, network 1602 may include the Internet or one or more intranets, landline networks, wireless networks, and/or other appropriate types of networks. Network 1602 may be a small-scale communication network, such as a private or local area network, or a larger scale network, such as a wide area network.

Various components that are accessible to network 1602 may be computing device(s) 1604, service provider server(s) 1606, and payment provider server(s) 1608. Computing devices 1604 may be portable and non-portable electronic devices under the control of a user and configured to transmit, receive, and manipulate data from service provider server(s) 1606 and payment provider server(s) 1608 over network 1602. Example computing devices 1604 include desktop computers, laptop computers, tablets, smartphones, wearable computing devices, eyeglasses that incorporate computing devices, implantable computing devices, etc.

Computing devices 1604 may include one or more applications 1610. Applications 1610 may be pre-installed on the computing devices 1604, installed on the computing devices 1604 using portable memory storage devices, such as compact disks or thumb-drives, or be downloaded to the computing devices 1604 from service provider server(s) 1606 and/or payment provider server(s) 1608. Applications 1610 may execute on computing devices 1604 and receive instructions and data from a user, from service provider server(s) 1606, and payment provider server(s) 1608.

Example applications 1610 may be payment transaction applications. Payment transaction applications may be configured to transfer money world-wide, receive payments for goods and services, manage money spending, etc. Further, applications 1610 may be under an ownership or control of a payment service provider, such as PAYPAL®, Inc. of San Jose, CA, USA, a telephonic service provider, a social networking service provider, and/or other service providers. Applications 1610 may also be analytics applications. Analytics applications perform business logic, provide services, and measure and improve performance of services and functions of other applications that execute on computing devices 1604 based on current and historical data. Applications 1610 may also be security applications for implementing client-side security features, programmatic client applications for interfacing with appropriate application programming interfaces (APIs) over network 1602, communication applications, such as email, texting, voice, and instant messaging applications that allow a user to send and receive emails, calls, texts, and other notifications through network 1602, and the like. Applications 1610 may be location detection applications, such as a mapping, compass, and/or global positioning system (GPS) applications, social networking applications and/or merchant applications. Additionally, applications 1610 may be service applications that permit a user of computing device 1604 to receive, request and/or view information for products and/or services, and also permit the user to purchase the selected products and/or services.

In an embodiment, applications 1610 may utilize numerous components included in computing device 1604 to receive input, store and display data, and communicate with network 1602. Example components are discussed in detail in FIG. 17.

As discussed above, one or more service provider servers 1606 may be connected to network 1602. Service provider server 1606 may also be maintained by a service provider, such as PAYPAL®, a telephonic service provider, social networking service, and/or other service providers. Service provider server 1606 may be software that executes on a computing device configured for large scale processing and that provides functionality to other computer programs, such as applications 1610 and applications 1612 discussed below.

In an embodiment, service provider server 1606 may initiate and direct execution of applications 1612. Applications 1612 may be counterparts to applications 1610 executing on computing devices 1604 and may process transactions at the requests of applications 1610. For example, applications 1612 may be financial services applications configured to transfer money world-wide, receive payments for goods and services, manage money spending, etc., that receive message from the financial services applications executing on computing device 1604. Applications 1612 may be security applications configured to implement client-side security features or programmatic client applications for interfacing with appropriate application programming interfaces (APIs) over network 1602. Applications 1612 may be communication applications that perform email, texting, voice, and instant messaging functions that allow a user to send and receive emails, calls, texts, and other notifications over network 1602. In yet another embodiment, applications 1612 may be location detection applications, such as a mapping, compass, and/or GPS applications. In yet another embodiment, applications 1612 may also be incorporated into social networking applications and/or merchant applications.

In an embodiment, applications 1610 and applications 1612 may process transactions on behalf of a user. In some embodiments, to process transactions, applications 1610, 1612 may request payments for processing the transactions via payment provider server(s) 1608. For instance, payment provider server 1608 may be a software application that is configured to receive requests from applications 1610, 1612 that cause the payment provider server 1608 to transfer funds of a user using application 1610 to service provider associated with application 1612. Thus, applications 1610 and 1612 may receive user data, including user authentication data, for processing any number of electronic transactions, such as through payment provider server 1608.

In an embodiment, payment provider servers 1608 may be maintained by a payment provider, such as PAYPAL®. Other payment provider servers 1608 may be maintained by or include a merchant, financial services provider, credit card provider, bank, and/or other payment provider, which may provide user account services and/or payment services to a user. Although payment provider servers 1608 are described as separate from service provider server 1606, it is understood that one or more of payment provider servers 1608 may include services offered by service provider server 1606 and vice versa.

Each payment provider server 1608 may include a transaction processing system 1614. Transaction processing system 1614 may correspond to processes, procedures, and/or applications executable by a hardware processor. In an embodiment, transaction processing system 1614 may be configured to receive information from one or more applications 1610 executing on computing devices 1404 and/or applications 1612 executing on service provider server 1606 for processing and completion of financial transactions. Financial transactions may include financial information corresponding to user debit/credit card information, checking account information, a user account (e.g., payment account with a payment provider server 1608), or other payment information. Transaction processing system 1614 may complete the financial transaction for the purchase request by providing payment to application 1612 executing on service provider server 1606.

Payment provider server 1608 may also include user accounts 1416. Each user account 1616 may be established by one or more users using applications 1410 with payment provider server 1608 to facilitate payment for goods and/or services offered by applications 1612. User accounts 1616 may include user information, such as name, address, birthdate, payment/funding information, travel information, additional user financial information, and/or other desired user data. In a further embodiment, user accounts 1616 may be stored in a database or another memory storage described in detail in FIG. 17.

In some embodiments, WAH module 110 discussed in FIGS. 1-13 may be included in applications 1610, 1612, and in transaction processing system 1614 that use neural network 108. The WAH module 110 may prevent attacks on applications 1610, 412, and transaction processing system 1614 to prevent attacks that manipulate data and attempt to force applications 1610, 412, and transaction processing system 1614 to generate a fraudulent result.

Figure 17:
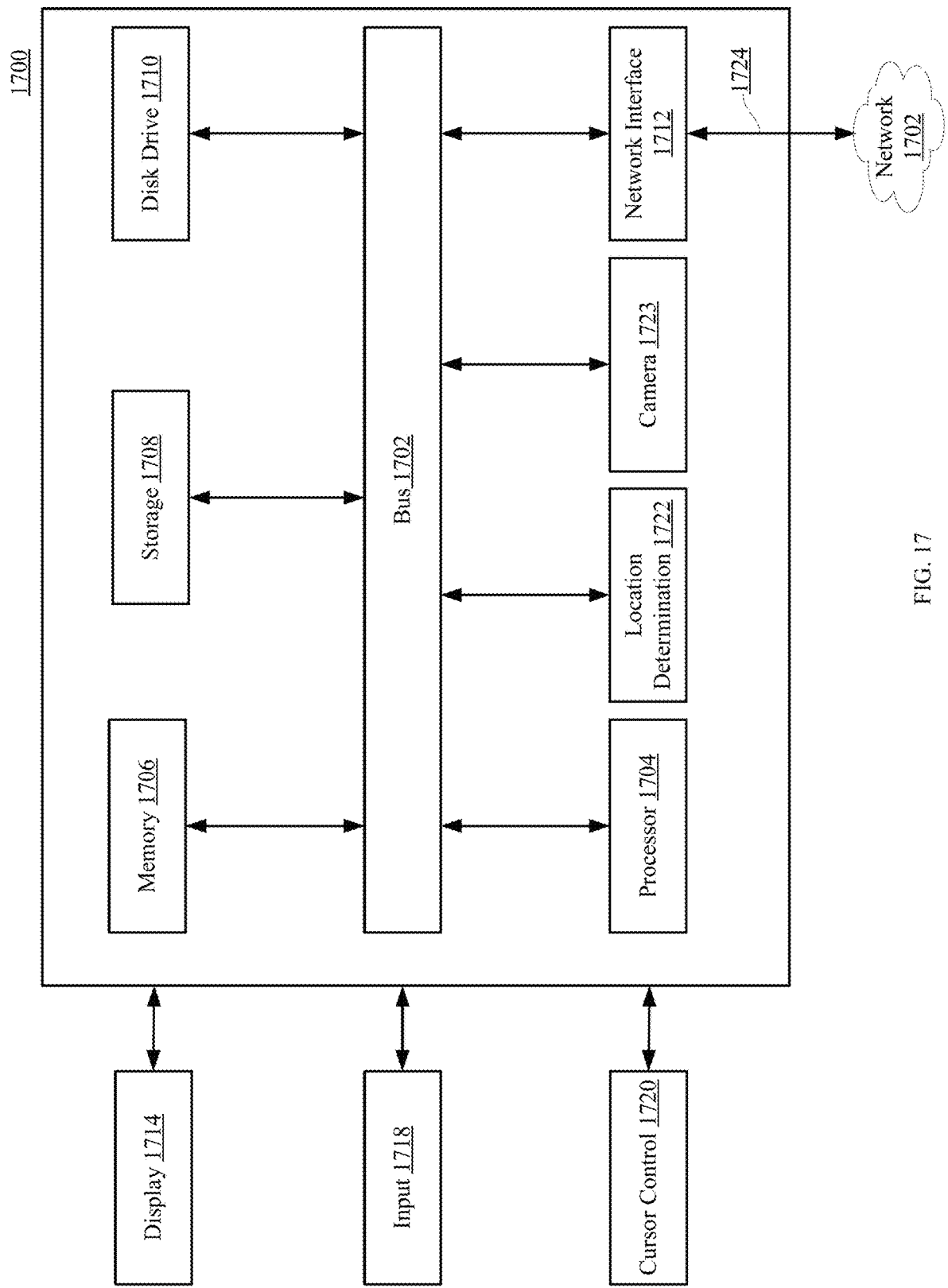
FIG. 17 is a block diagram of a computer system suitable for implementing one or more components or operations in FIGS. 1-16 according to an embodiment.

Referring now to FIG. 17 an embodiment of a computer system 1700 suitable for implementing, the systems and methods described in FIGS. 1-16 is illustrated.

In accordance with various embodiments of the disclosure, computer system 1700, such as a computer and/or a server, includes a bus 1702 or other communication mechanism for communicating information, which interconnects subsystems and components, such as a processing component 1704 (e.g., processor, micro-controller, digital signal processor (DSP), graphics processing unit (GPU), etc.), a system memory component 1706 (e.g., RAM), a static storage component 1708 (e.g., ROM), a disk drive component 1710 (e.g., magnetic or optical), a network interface component 1712 (e.g., modem or Ethernet card), a display component 1714 (e.g., CRT or LCD), an input component 1718 (e.g., keyboard, keypad, or virtual keyboard), a cursor control component 1720 (e.g., mouse, pointer, or trackball), a location determination component 1722 (e.g., a Global Positioning System (GPS) device as illustrated, a cell tower triangulation device, and/or a variety of other location determination devices known in the art), and/or a camera component 1723. In one implementation, the disk drive component 1710 may comprise a database having one or more disk drive components.

In accordance with embodiments of the disclosure, the computer system 1700 performs specific operations by the processor 1704 executing one or more sequences of instructions contained in the memory component 1706, such as described herein with respect to the mobile communications devices, mobile devices, and/or servers. Such instructions may be read into the system memory component 1706 from another computer readable medium, such as the static storage component 1708 or the disk drive component 1710. In other embodiments, hard-wired circuitry may be used in place of or in combination with software instructions to implement the disclosure.

Logic may be encoded in a computer readable medium, which may refer to any medium that participates in providing instructions to the processor 1704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1710, volatile media includes dynamic memory, such as the system memory component 1706, and transmission media includes coaxial cables, copper wire, and fiber optics, including wires that comprise the bus 1702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1700. In various other embodiments of the disclosure, a plurality of the computer systems 1700 coupled by a communication link 1724 to the network 1402 (e.g., such as a LAN, WLAN, PTSN, and/or various other wired or wireless networks, including telecommunications, mobile, and cellular phone networks) may perform instruction sequences to practice the disclosure in coordination with one another.

The computer system 1700 may transmit and receive messages, data, information and instructions, including one or more programs (i.e., application code) through the communication link 1724 and the network interface component 1712. The network interface component 1712 may include an antenna, either separate or integrated, to enable transmission and reception via the communication link 1724. Received program code may be executed by processor 1704 as received and/or stored in disk drive component 1710 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method, comprising:
    receiving a data sample at an ensemble module comprising first classifier neural network and second classifier network pair, wherein the pair in the ensemble module comprises a first classifier neural network that includes convolutional layers and first fully connected layers, and a second classifier network that includes second fully connected layers;
    generating, using the convolutional layers of the first classifier neural network, a feature map from the data sample;
    classifying, using the first fully connected layers of the first classifier neural network, the feature map into a watermark label;
    passing the watermark label through the second fully connected layers of the second classifier network of the pair to generate a classifier; and
    determining, using the classifier from second classifier network, that the data sample is an adversarial data sample or a non-adversarial data sample based on watermark label.

2. The method of claim 1, wherein the data sample includes a watermark that is associated with the watermark label.

3. The method of claim 1, wherein the data sample is perturbed to include adversarial data.

4. The method of claim 1, wherein the convolutional layers include a first layer and a second layer, wherein the width and the height of the first layer is greater than the width and the height of the second layer and the depth of the first layer is less than the depth of the second layer.

5. The method of claim 1, wherein the first fully connected layers include a first layer and a second layer, and the width of the first layer is greater than the width of the second layer.

6. The method of claim 1, wherein the first fully connected layers include a first layer and a second layer, and the height and depth of the first layer are the same as the height and the depth of the second layer.

7. The method of claim 1, wherein generating the feature map further comprises:
passing the data sample through a convolutional layer in the convolutional layers that includes a rectifier linear unit as an activation function.

8. The method of claim 1, wherein generating the feature map further comprises:
passing the data sample through at least one batch normalization layer that is inserted between a first convolutional layer and a second convolutional layer in the convolutional layers.

9. The method of claim 1, wherein classifying further comprises classifying the feature map into a second watermark label in the watermark labels; and
wherein determining that the data sample is the adversarial data sample or the non-adversarial data sample is further based on the second watermark label.

10. A system, comprising:
a memory configured to store an ensemble module having first classifier neural network and second classifier network pairs; and
a processor coupled to the memory and configured to read the instructions from the memory to cause the instructions to perform operations comprising:
for each pair:
generate, using the first classifier neural network, a feature map from a data sample;
classify, using the first classifier neural network, the feature map into a watermark label in watermark labels; and
generate, by passing the watermark label through the second classifier network, a classifier; and
determine, using classifiers from second classifier networks in the pairs, that the data sample is an adversarial data sample or a non-adversarial data sample based on the watermark label.

11. The system of claim 10, wherein the data sample includes a watermark that is associated with the watermark label.

12. The system of claim 10, wherein the data sample is perturbed to include adversarial data.

13. The system of claim 10, wherein to generate the feature map the processor is further configured to perform operations comprising:
pass the data sample through a convolutional layer in convolutional layers of the first classifier neural network of each pair, wherein the convolutional layer uses a rectifier linear unit as an activation function.

14. The system of claim 10, wherein the memory is further configured to store at least one batch normalization layer between a first convolutional layer and a second convolutional layer in convolutional layers of the first classifier neural network of each pair; and
wherein to generate the feature map the processor is further configured to perform operations comprising:
passing the data sample from the first convolutional layer to at least one batch normalization layer and to the second convolutional layer.

15. The system of claim 10, wherein the processor is further configured to perform operations comprising:
classify the feature map into a second watermark label in the watermark labels; and
determine that the data sample is the adversarial data sample or the non-adversarial data sample based on the second watermark label.

16. The system of claim 10, wherein each pair is further trained on a different watermark dataset having watermarks corresponding to different watermark labels.

17. A non-transitory machine-readable medium having stored thereon machine-readable instructions executable to cause a machine to perform operations comprising:
receive a data sample at an ensemble module comprising first classifier neural network and second classifier network pairs, wherein each pair comprises a first classifier neural network having convolutional layers and first fully connected layers and a second classifier network having second fully connected layers;
for each pair:
generate, using at least one convolutional layer of the first classifier neural network, a feature map from the data sample; and
classify, using first fully connected layers of the first classifier neural network, the feature map into a watermark label;
aggregate watermark labels from first classifier neural networks in the pairs;
pass the aggregated watermark labels through the second fully connected layers of second classifier networks in the pairs to generate classifiers; and
determine, using the classifiers, that the data sample is an adversarial data sample or a non-adversarial data sample.

18. The non-transitory machine readable medium of claim 17, wherein the data sample includes a watermark that is associated with the watermark label.

19. The non-transitory machine readable medium of claim 17, wherein the data sample is perturbed to include adversarial data.

20. The non-transitory machine readable medium of claim 17, wherein to generate the feature map, the operations further comprise:
pass the data sample through at least one batch normalization layer that is inserted between a first convolutional layer and a second convolutional layer in the convolutional layers.

* * * * *